US006723986B2

(12) United States Patent
Kernan et al.

(10) Patent No.: US 6,723,986 B2
(45) Date of Patent: Apr. 20, 2004

(54) APPARATUS FOR MANIPULATION OF IONS AND METHODS OF MAKING APPARATUS

(75) Inventors: Jeffrey T. Kernan, Santa Cruz, CA (US); Edward C. Cirimele, Mountain View, CA (US); Mingda Wang, Fremont, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 65 days.

(21) Appl. No.: 10/027,333

(22) Filed: Mar. 15, 2002

(65) Prior Publication Data

US 2003/0178564 A1 Sep. 25, 2003

(51) Int. Cl.[7] .............................................. B01D 59/44

(52) U.S. Cl. ...................................................... 250/292

(58) Field of Search ........................................ 250/292

(56) References Cited

U.S. PATENT DOCUMENTS

| | | | | |
|---|---|---|---|---|
| 5,384,461 A | | 1/1995 | Jullien et al. | |
| 5,852,270 A | | 12/1998 | Holkeboer | |
| 6,049,052 A | * | 4/2000 | Chutjian et al. | 219/69.12 |
| 6,239,429 B1 | * | 5/2001 | Blessing et al. | 250/292 |

* cited by examiner

*Primary Examiner*—John R. Lee
*Assistant Examiner*—Phillip A Johnston

(57) ABSTRACT

A device for manipulating ions which includes a perforated folder of electrically conducted material, a first electrode fixed to the holder and a second electrode extending parallel to the first electrode and spaced from the first electrode and holder. The second electrode is connected to the holder through a rigid support of electrically insulated material.

14 Claims, 29 Drawing Sheets

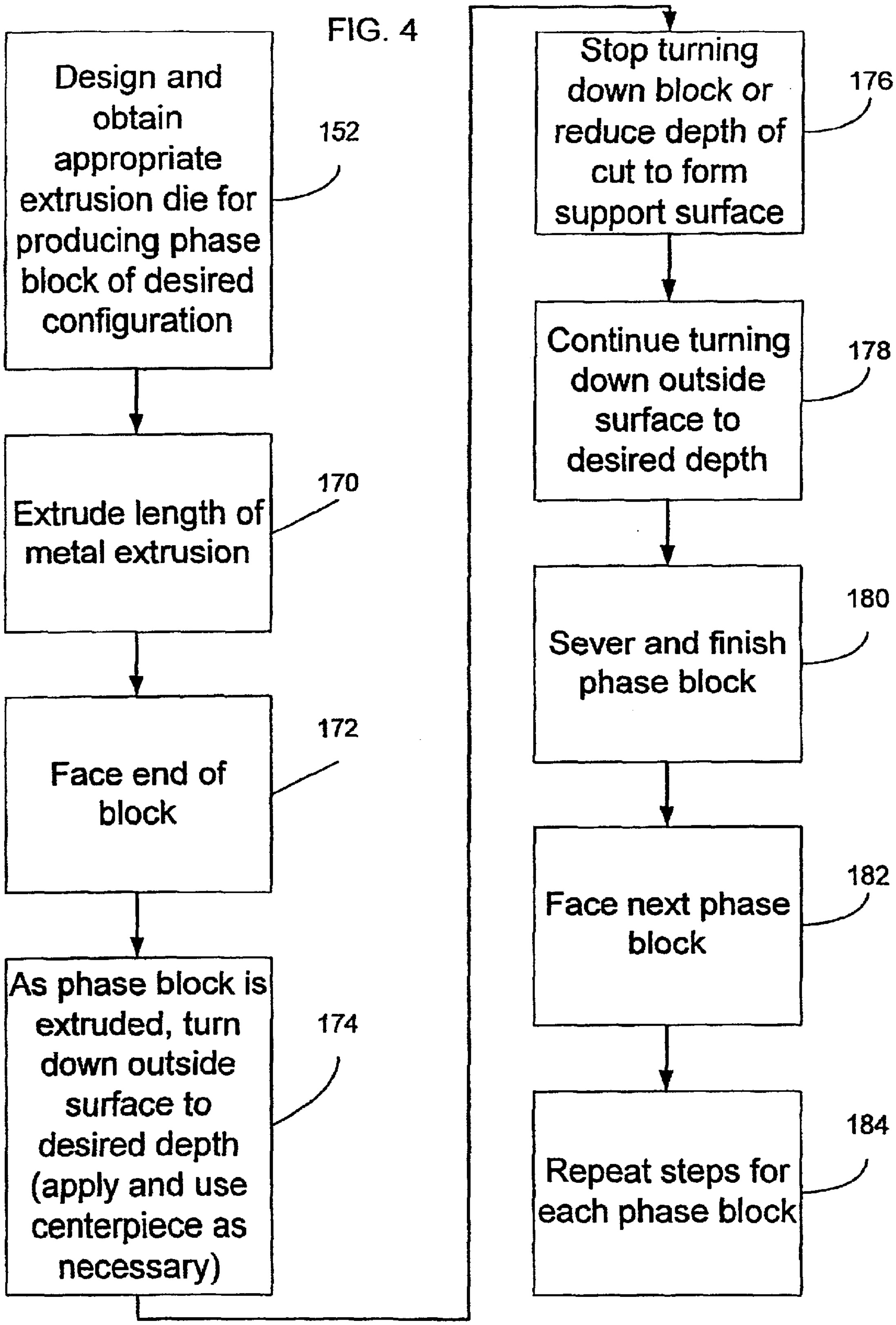
FIG. 4
Design and obtain appropriate extrusion die for producing phase block of desired configuration
152
Extrude length of metal extrusion
170
Face end of block
172
As phase block is extruded, turn down outside surface to desired depth (apply and use centerpiece as necessary)
174
Stop turning down block or reduce depth of cut to form support surface
176
Continue turning down outside surface to desired depth
178
Sever and finish phase block
180
Face next phase block
182
Repeat steps for each phase block
184

APPARATUS FOR MANIPULATION OF IONS AND METHODS OF MAKING APPARATUS

CROSS-REFERENCE TO RELATED APPLICATIONS

NOT APPLICABLE

STATEMENT REGARDING FEDERALLY SPONSORED RESEARCH OR DEVELOPMENT

This invention has been created without the sponsorship or funding of any federally sponsored research or development program.

BACKGROUND OF THE INVENTION

1. Field of the Invention

These inventions relate to methods and apparatus for manipulating or transporting ions, for example multi-element ion transports, analyzers, for example quadrupole mass filters, multipole ion guides, devices for ion containment, as well as methods of making devices for controlling ions.

2. Related Art

Mass spectrometers and other analyzers have been used to determine the properties or characteristics and quantities of unknown materials, many of which are present in only minute quantities. Mass spectrometers are used in atomic and chemical analysis to determine the quantity and atomic or chemical makeup of unqualified or unknown atoms and compounds. Many such analyzers function by determining the quantity of material present in an unknown solution as a function of the mass-to-charge ratio of ions provided to the analyzer by a source of ions. The ability of the analyzer to produce reliable results depends in part on the ability of its components to get as many of the desired ions as possible from the source of ions to the detector. Additionally, the precision of the components is directly related to the types of materials used and the methods of manufacture and assembly, as well as the size of the components, in some cases. Smaller components generally require higher precision and more careful manufacture and assembly, for a given set of operating results. More precise components generally have a higher material and/or assembly cost, than other components.

One type of analyzer is a quadrupole mass spectrometer system, which generally consists of a source of ions, a quadrupole mass filter, an ion detector and associated electronics. It may also include an ion guide such as a multipole ion guide. A gaseous, liquid or solid sample ionized in the ion source and a portion of the ions created in the ion source is injected into the ion guide which transports the ions to the quadrupole mass filter. The filter rejects all ions except those in a selected mass-to-charge ratio (mass/charge) range as determined by the system electronics. (It will be understood from the context herein where the references to mass without mentioning charge refer to the mass-to-charge ratio, as appropriate, even though charge is not specifically expressed, because of the field depends on the charge of the ions). That selected mass range is usually less than 1 atomic mass unit (AMU) centered at a particular mass. Because the masses of the elements making up the sample are often unknown, the system varies the mass range from a starting mass number to an ending mass number to test for and sense particles having the masses within the mass range selected. The mass range can be as low as one AMU up to thousands of AMU. the system operates either automatically or under manual control. The mass analysis of the composition of the sample is performed by rapidly scanning the DC and RF voltage, or the frequency of the RF voltage, on the quadrupole filter, thereby scanning through the possible masses and recording the abundance of each as transmitted through the filter.

A conventional quadrupole ion guide or mass filter consists of four conductive rods arranged with their long axes parallel to a central axis and equidistant from it. The cross sections of the rods are preferably hyperbolic for a mass filter, although rods of circular cross section ("round rods") are common. In the case of an ion guide, an RF voltage is applied to opposite pairs of poles without a DC component, so that opposite rods have the same potential and adjacent rods have equal but opposite potentials. To select which ions are rejected and which are passed through a mass filter, a selectable voltage ±(U+V cos?) is applied on adjacent rods have equal but opposite potentials. U is the DC or offset voltage and V is the radio frequency (RF) component of the voltage applied to the quadrupole rods, at a given frequency w and time t. The field created within the region surrounded by the rods is a quadrupole field, with the electric field sensed by the ions traveling between the rods directly proportional to the distance from the central axis.

In the context of mass filter, ions injected into he entrance of the filter will exhibit oscillatory trajectories generally in the direction of the central axis (Z-axis). Those ions that oscillate too far form the central axis (in the X-axis and/or in the Y-axis directions) will, in general, not pass through the filter, while those ions that exhibit relatively short oscillatory trajectories pass from the exit of the filter and are detected. The extent of the oscillatory trajectories for a given ion mass is determined by the selected voltage. The selected voltage comes from a certain set of pre-determined voltages that are a function of the mass of the ions. the pre-determined voltage are typically developed empirically for the particular mass spectrometer configuration, and are stored in a computer or other processor memory as a look up table or equation for use during operation of the system. The magnitudes and ratio of the DC and RF components of e applied voltage can be adjusted such that only a very narrow mass range of ions will pass through the device. The narrower the mass range of the ions passing through the device, the higher the resolution, and the easier it is to distinguish ions of similar masses. Sweeping the RF voltage with a fixed RF/DC ratio will result in a mass spectrum over the range of masses selected for analysis.

Other factors affect the operation of the analyzer, such as component lengths and other dimensions, the use of vacuum, possible fringe fields at the ends of components, and the presence or absence of focusing the other elements.

Various factors also affect the cost and operation of individual components or elements. For example, the cost is typically proportional to the precision with which components are made and assembled, which in turn affects the accuracy and precision of the component. Small, precision-made components are typically more costly to make and assemble into a final component than are larger, less precise components. Mold techniques or electrode discharge machining (EDM) may be used to form very small, micro-machined components, and conventional machining, welding, brazing, and soldering can be used to form larger components. However, conventional machining and joining techniques become more difficult and expensive as the components get smaller, especially where the components are to be supported or where electrical connections are to be made. Likewise, as the number of piece parts increases, the complexity and cost of the component typically increases as well, while the precision of the components may not increase to the same extent as the complexity and the added cost has increased. Additionally, making connections with multiple wires to multiple poles or electrodes increases the cost and complexity of the component, as well as the potential discard rate.

Simple shapes for components are common and less expensive, especially for machined parts. For example, ion guides and quadrupole mass filters often use round rods as the primary elements for manipulating or transporting ions. However, hyperbolic rod cross sections may be preferred, but are more expensive and difficult to manufacture.

Additionally, the materials used in a component also affect operation, for example based on the electrical and insulting characteristics of the material. For example, stainless-still is readily used, but other metallic materials such as molybdenum, tungsten or gold coated quartz may be used as well. The materials used may depend on the available budget and the desired precision and accuracy for the component.

BRIEF SUMMARY OF THE INVENTION

In a preferred embodiment of one of the present inventions, a multipole ion device includes first and second pairs of electrodes, each pair electrically insulated from the other pair, and having first and second ends. Each of the electrodes in the pairs of the electrodes includes respective first ends, and the first ends of the first pair of electrodes are supported by and integral with a first support element. The first ends of the second pair of electrodes are spaced apart from the first support element and coupled to it by respective insulated support pieces. The insulated support pieces can be ceramic pins or rods, metal rods encapsulated in ceramic, ceramic or other rods encapsulated in spaced-apart metal caps or other preferably rigid insulating elements. In one preferred embodiment, the support element is a ring at an end of the device, having two diametrically opposed sides supporting the first ends of the first pair electrodes with the intermediate sides of the ring having arcuate gaps or openings so that the ring is spaced from and does not contact the second pair of electrodes except through the insulated support pieces. the insulated support pieces preferably extend axially relative to the device. Axial positioning more easily accommodates any thermal expansion and contraction in the device without significantly affecting performance.

In a further aspect of one of the present inventions, a device for manipulating ions is produced by casting, molding, or removing material from a single solid block of electrode-type material, preferably in stages. In one preferred form of the inventions, a cylindrical blank of material, such as, for example, stainless-still or titanium, is machined to produce a bore extending through the blank preferably coaxial with the center axis of the cylindrical blank. For a quadrupole, four axially extending channels are formed in the outer or peripheral surface of the blank to define parts of the outer edges of the four electrodes. Outer circumferential grooves are also formed in the blank, spaced axially inward from the respective ends of the blank. Each of the grooves separate respective end plates from the outer portions of the electrodes. The grooves are preferably deep enough to separate one pair of the electrodes form one end plate, in conjunction with arcuate gaps or openings formed in the end plate and in conjunction with the machining of the active surfaces of electrodes themselves. the arcuate gaps are formed by removing material from oppositely disposed sections of each end plate, and each gap is formed to follow the curvature of the perimeter of the end plate and spaced radially inward. The gaps in one end plate are oriented 90 degrees from the gaps in the other end cap. Rigid insulated pins or other fastening elements are fixed between an end plate and the respective electrodes from which they will be separated. For the one end plate, two pins will be used to fix the respective electrodes to the end plate for a quadrupole. For the other end plate, two pins will be used to fix the other electrodes to the other end plate. The electrodes themselves are then defined, preferably by electrode discharge machining, by removing material about the center axis. After final machining, one end plate will be integral with and support one pair of electrodes and will be fixed through insulated pins to the other pair of electrodes. The second end plate will be integral with and support the second pair of electrodes and will be fixed through insulated fins to the first pair of electrodes.

BRIEF DESCRIPTION OF THE DRAWINGS

FIG. 4 is a flow chart depicting steps of an extrusion method that can be used to produce polarity blocks.

FIG. 26 is an exploded isometric view of a pair of polarity blanks in accordance with further aspects of the present inventions, such as may be made through molding, casting, machining, and the like.

DETAILED DESCRIPTION OF THE INVENTION

Figure 1:
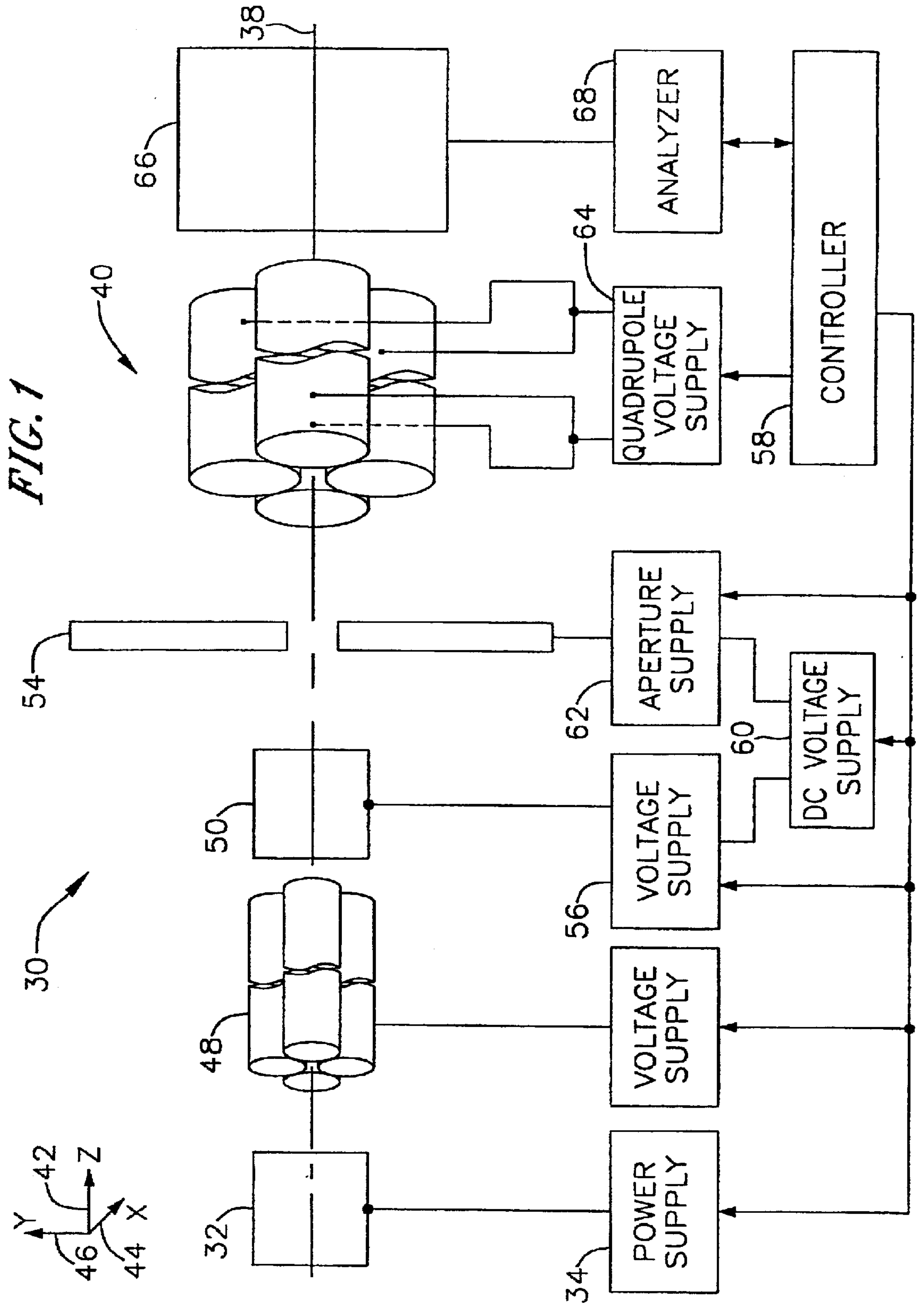
FIG. 1 is a schematic and partial block diagram of a mass spectrometer of a convention design incorporating an ion guide and a quadrupole mass filter.

The following specification taken in conjunction with the drawings set forth the preferred embodiments of the present inventions in such a manner that any person skilled in the art can make and use the inventions. The embodiments of the inventions disclosed herein are the best modes contemplated by the inventors for carrying out the inventions in a commercial environment, although it should be understood that various modifications can be accomplished with the parameters of the present inventions.

Apparatus and methods are described which can improve the design, manufacture and/or operation of multipole or multi-electrode devices, for example that may be used for manipulating or transporting ions. They may be used to reduce the assembly tooling and/or assembler handling. They may also reduce the cost of manufacture, especially with multiple electrode devices, give more flexibility in the design of such devices, or result in devices that are more robust and have better structural integrity. One or more aspects of these apparatus and methods may also be used to make smaller components and allow more flexibility in choosing the configuration of the component. By extruding, molding or otherwise forming the multipole profile, for example, such characteristics as rod precision, alignment and mounting may be built into the raw components. Additionally, design flexibility is increased and assembly process time is decreased. Furthermore, overall design robustness may be increased with fewer parts and fewer connections.

Part of the following discussion focuses on multipole ion guides, such as those that include quadrupole, hexapole and octapole ion guides, because these are among the useful applications, for example for an extruded multipole assembly. However, the concepts in the structures and methods are applicable to other designs, to other components in apparatus for manipulating or transporting ions, and other applications of multipole or multi-electrode devises. They are applicable, for example, to quadrupole electrode spectrometers and mass filters, collision cells, lenses, collisional cooling systems, multiple stage ion processing, ion beam transports, gas conductance limit tubes, linear ion traps or any devices with multiple electrodes or multiple electrical connections, especially where an electrical signal is applied to more than one electrode or component at the same time. In another part of the discussion, aspects of the inventions are discussed that are particularly useful to applications where precision is preferred. Applications that benefit from higher precision components include multipole mass analyzers, quadrupole ion sources, quadrupole electrode spectrometers, collision cells, lenses and lens stacks, stacked filters such as serial stacked filters, ion traps and collisional cooling, or any devices with multiple electrodes or multiple electrical connections, especially where an electrical signal is applied to more than one electrode or component at the same time. It will be apparent to those skilled in the art that some aspects of the inventions described are more appropriately applicable to some devices than others, depending on the desired end use, precision and accuracy, the cost, and other factors. One or more of the various aspects of these inventions can be combined or omitted to achieve desired results, taking advantage of benefits resulting from such combinations, while omitting some of the other features and benefits described for other aspects of the inventions described.

Manipulation or transport of ions may include a number of operations and purposes, including without limitation analyzing ions, fragmentation, trapping, confinement, as well as other operations and purposes. It is believed that one or more aspects of the present inventions can be easily implemented in any number of configurations while still achieving one or more of the results obtained in the configurations described herein.

As an example of a system in which an ion guide and/or a quadrupole mass filter can be used, a typical mass filter spectrometer 30 (FIG. 1) includes a source of ions 32 for ejecting ions driven by a suitable power supply 34. The source of ions can be any of a number of devices, including electron impact, atmospheric pressure chemical ionization, plasma, electrospray or a collision cell of a triple quadrupole mass spectrometer.

While the ions are ejected in a number of directions and with a range of velocities, they are traveling generally in the direction of the central axis 38 of the quadrupole mass filter 40. The central axis 38 is generally considered the Z-directions represented at 42. many ions are headed in directions of the Z-axis more or less also in the directions of the X-axis and the Y-axis, respectively identified with reference numbers 44 and 46.

The quadrupole mass filter spectrometer also may include ion optics to reposition or redirect the ions toward the quadrupole mass filter 40 and along the central axis 38. The ion optics may include an ion guide 48, and may also include on or more electrodes 50 for redirecting and/or repositioning ions in the ion beam. An entrance aperture 54 may be included to reduce the effects of fringe fields at the entrance end of the quadrupole mass filter 40. The ion guide 48 and each of the electrodes 50 have voltages applied to them through one or more voltage supplies 56, which in turn may be supplied by a D.C. voltage supply 60. Voltage supply 56 provides discrete and separate voltages to each ion guide and the individual electrodes. Voltage supply 56 may be controlled and operated by a controller 58 or other apparatus. The entrance aperture 54 may also have a voltage on it as determined by an aperture supply 62, which in turn can be supplied by the D.C. voltage supply 60 and controlled by a controller or other suitable apparatus.

The mass filter is driven by a suitable quadrupole voltage supply 64, which may be controlled by a suitable controller such as microprocessor programmed with control software and data sufficient to allow the quadrupole mass filter to scan ions having masses coming with the range specified for the mass filter spectrometer. As is known, the convention quadrupole mass filter filters out ions outside the mass range of interest and transmits ions within the selected range to an ion collector 66 to be analyzed by an analyzer 68. The analyzer 68 may be controlled by and may output results to the controller 58.

Multiple components incorporating one or more aspects of the present inventions can also be used in other parts of the system shown in FIG. 1, as well as in other assemblies for analyzing ions or for transporting or manipulating ions. For example, the mass analyzer may include a quadrupole mass filter, a collision cell, a triple quadrupole assembly, and/or other multiple electrode components. Other assemblies not discussed herein can also incorporate these components, as would be understood to one skilled in the art.

Figure 2:
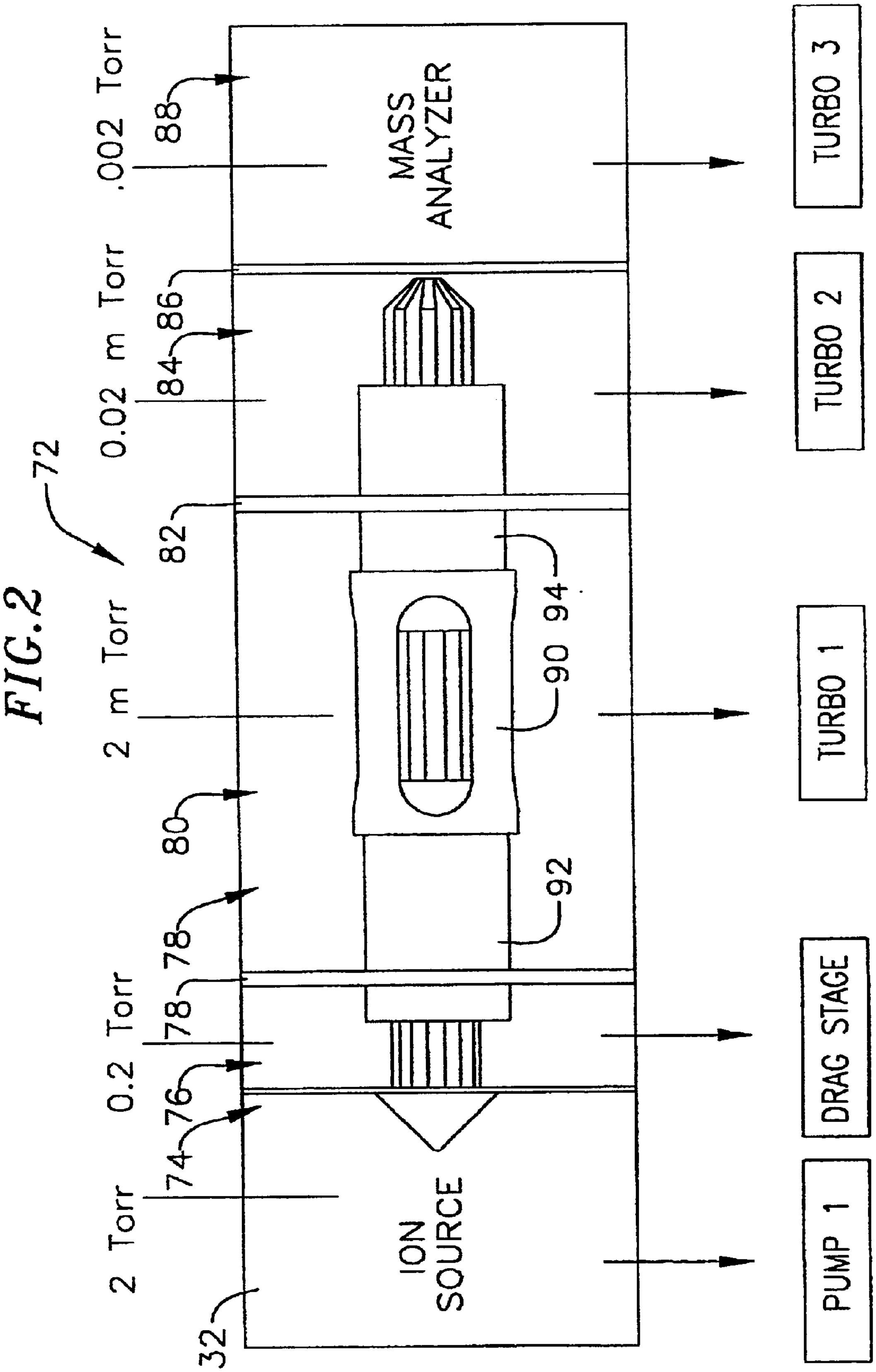
FIG. 2 is a schematic of an exemplary set of components for use in a mass spectrometer such as that depicted in FIG. 1.

As an example of one application for one or more aspects of the present inventions, an ion guide 70 is shown (FIG. 2) for a liquid chromatography mass spectrometer 72. The ion guide can extend as a single component through multiple stages. The spectrometer 72 can include a skimmer 74 between a vacuum stage for the ion source 32 and a drag stage 76, and a wall 78 between the drag stage 76 and a vacuum stage 80 for allowing two different vacuum stages around an upstream portion of the ion guide. The vacuum stage 80 is separated by a second wall 82 from a third vacuum stage 84, which also allows different vacuum stages around a portion of the ion guide. A third wall 86 separates the third vacuum stage 84 from a mass analyzer 88, which may be conventional or which may incorporate one or more aspects of the present inventions.

The ion guide 70, described more fully below, can include first and second polarity blocks nested together and rigidly fixed relative to each other, such as by an insulating gas-permeable sleeve 90 holding a first electrode support 92, which supports corresponding electrodes in the first polarity block, fixed and spaced apart relative to a second electrode support 94, which in turn supports the corresponding electrodes in the second polarity block. Each of the electrode supports 92 and 94 preferably include respective gas-impermeable outer walls limiting radial gas conductance, thereby allowing the single ion guide component to extend and operate in more than one vacuum stage.

While the spectrometer 72 shows five separate stages, two or more stages can be combined. Additionally, Turbo pumps can be used having multiple inlets, and, for example, the drag stage through the mass analyzer stage could possibly be a pump with one multi-stage, multi-inlet Turbo pump. The vacuum pressures to be used would be optimized depending on the instrument, its application, the pump characteristics, and the like.

The foregoing applications described particular examples of structural configurations and pumping schemes that could be used with the structures described herein. However, it should be understood that other applications could benefit from the inventions, and other configurations, combinations and designs could use the inventions as well.

An ion guide, such as may be used in a mass analyzer, or other multi-electrode component can be made in a number of ways in accordance with one or more aspects of the present inventions. In one preferred embodiment, a blank of material is provided 100 (FIG. 3) that can be used to produce a polarity block. The phrase "polarity block" will be used herein to refer to a precursor or final elements(s) to which may be applied a voltage of a given magnitude, polarity, frequencies and phases at a given time and that contributes thereby to the production of an electric field. Preferably, though not necessarily, each of the polarity blocks used to form a final component, for example an ion guide, will be identical to each other in form, structure and dimension. Typically, two polarity blocks will be oriented and assembled to form the desired component. However, it should be understood that one or more aspects of the inventions can be adopted even when only one polarity block is used, or when more than two polarity blocks are used in a single component.

Figures 6, 7:
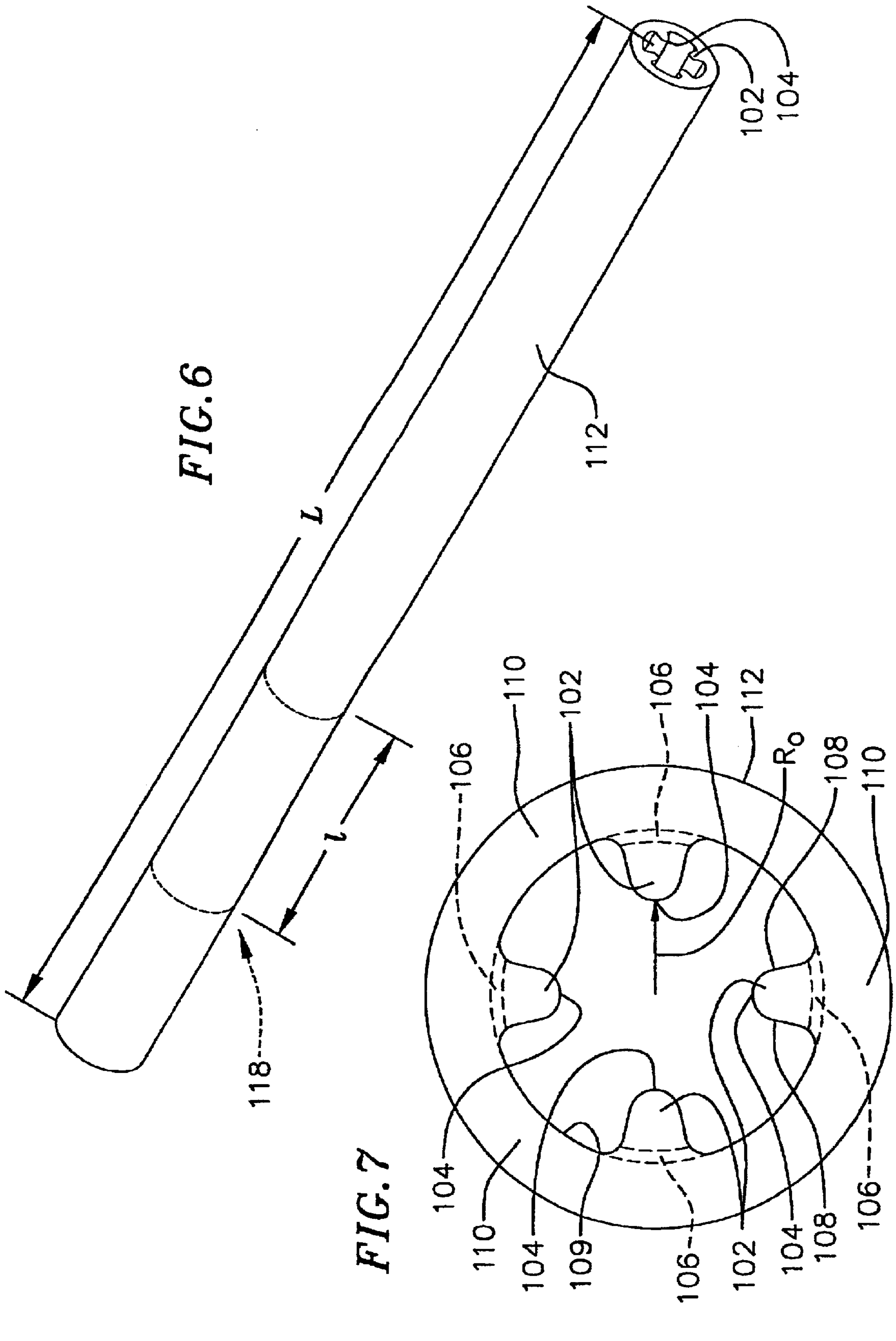
FIG. 6 is an isometric view of an extruded polarity blank for use, for example, as one set of poles of an ion guide, before supporting material has been removed.
FIG. 7 is an end view of the extrusion of FIG. 6.
Figure 8:
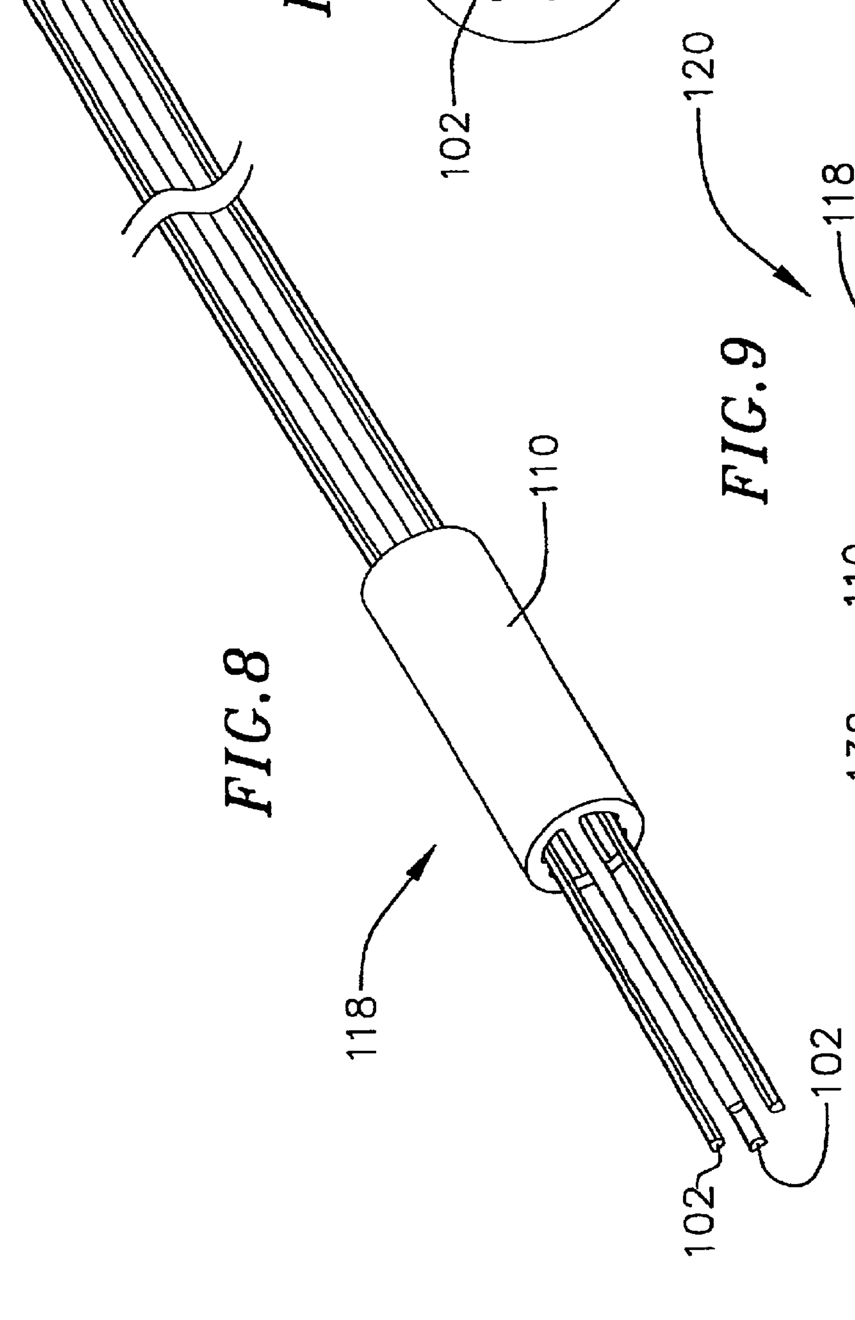
FIG. 8 is an isometric view of a polarity blank having supporting material removed to expose cantilevered electrodes.
Figure 10:
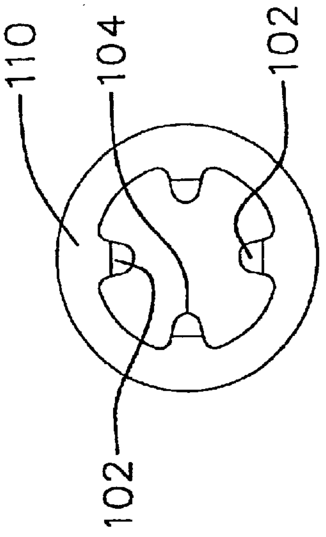
FIG. 10 is an end view of the polarity blank of FIG. 8.
Figure 9:
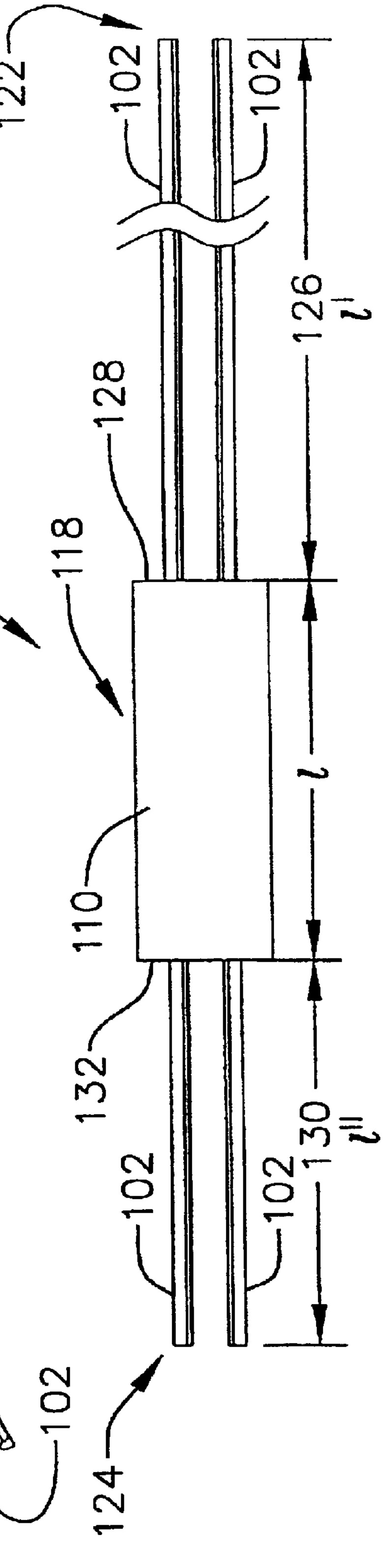
FIG. 9 is a side view of the polarity blank of FIG. 8.
Figure 11:
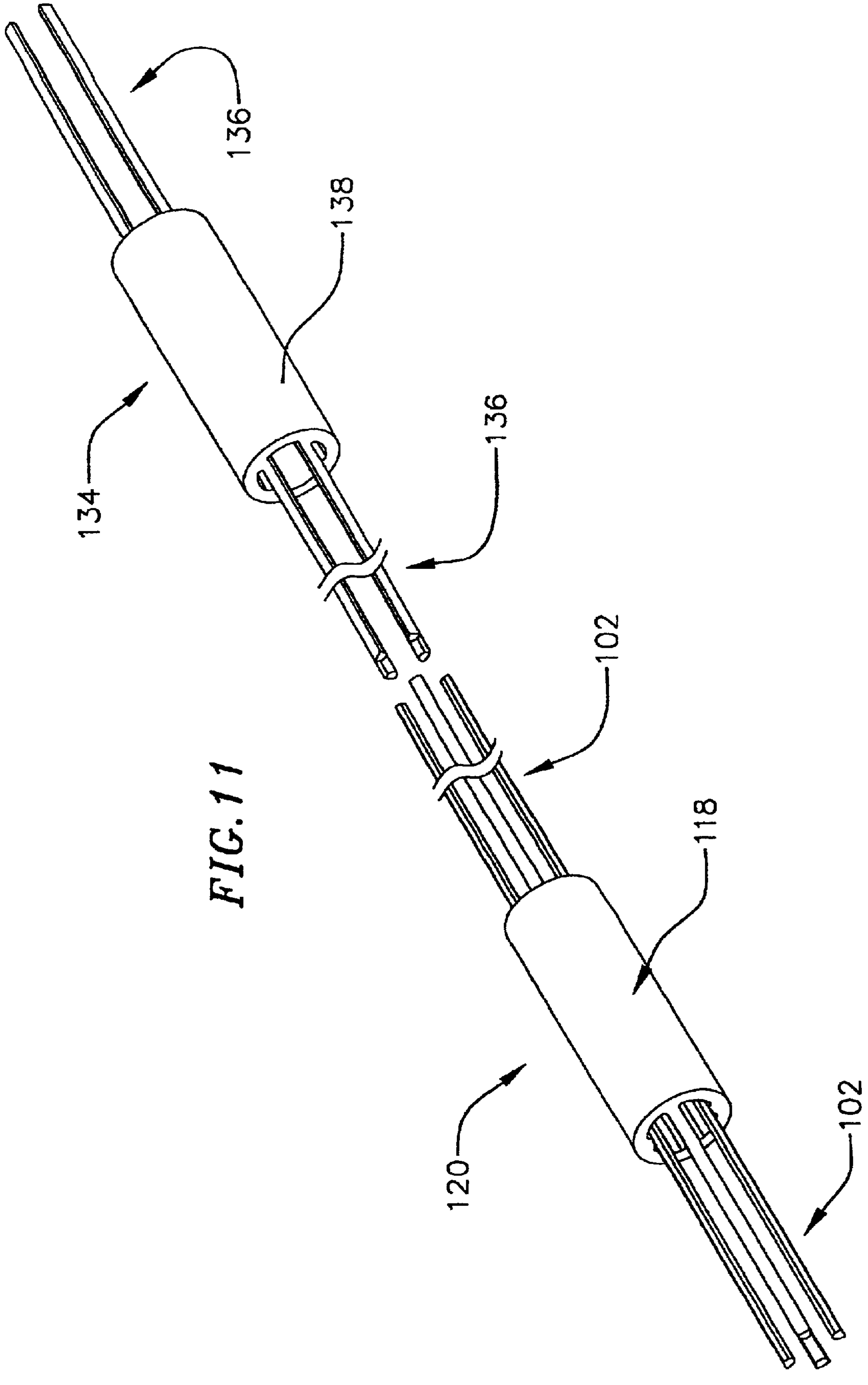
FIG. 11 is an isometric view of two polarity blanks positioned to be coaxial with each other, with one rotated relative to the other to allow nesting.

The blank of material may have been created by suitable preliminary processes, but in the preferred embodiments discussed herein, the blank of material will have one or more electrodes, or one or more precursor electrodes to be processed further, and an electrode support structure. As shown in FIG. 7, for example, the blank of material preferably has at least two, and in the embodiment shown in FIG. 7, four electrodes 102 to be used to manipulate ions under the influence of an electric field of a given polarity. in their form shown in FIGS. 6 and 7, the electrodes are precursor electrodes in the at material will still be removed to create their final form, whether by conventional machining, EDM, etching or otherwise. In the blank of material, each electrode 102 extends the longitudinal length L of the blank (FIG. 6), and extends radially from an inner most point 104 to an approximate transition region 106 adjacent an inside surface or wall 109, where the electrodes and their exposed radial surfaces 108 transition to a support portion 110. Support portion 110 for supporting electrodes may be arcuate, non-linear in that it typically need to be straight, and in one preferred embodiment extends around to support at least one other electrode.

The electrode surface, in the final form, will have an active surface portion that extends from the inner-most point or tip 104 radially outwardly on each side. The radial extent of the active electrode surface will depend on how the surface is finished, if at all, and the cross-sectional shape of the electrode, among other factors. Generally, the active electrode surface is that portion of the surface that defines or contributes to the definition of the electric field produced around the electrode. It can be considered to extend axially along the tip 104 of the electrode, and radially outward, to approximately a distance of about twice Ro, after which the field produced by the electrode is less significant foremost purposes and where twice Ro (or 2Ro) can be most simply defined as the diameter of the largest round pin or cylinder that can fit between opposing pole faces. The active surface generally comprises the surface atoms of the electrode and is generally the most accurately fabricated surface so that a suitable electric field can be created, with the underlying metal or other material supporting the active surface. the portion of the electrode past twice Ro and internal to the surface forms support material and also at the outer-most extent the transition region 106. Generally, however, the area where the active electrode surface ends and transition material or support material begins will vary with the circumstances.

The blank of material also preferably has a structure that can be considered a support 110 for structurally supporting at least one of the electrodes, and preferably all of the electrodes 102, and that is preferably conductive so that the support 110 can conduct current to at least one electrode and typically all of the electrodes in the polarity block. While the conductive support 110 does not need to extend the full longitudinal length of the polarity block, the conductive support 110 will preferably extend a sufficient distance along the length of the polarity block to adequately support each of the electrodes and to minimize any electrical resistance between the electrodes and nay electrical source. It should be noted that the electrode support 110 need not necessarily provide both the mechanical support and the electrical conductivity for energizing the electrodes in all applications. For example, where the electrode support provides sufficient strength to reliably fix the electrodes in place, attachment of electrical contacts to energize the electrodes is made easier. Consequently, electrode contact for generating the electric field can be made separately to the electrodes instead of or in addition to connection to the electrode support. Likewise, other support for the electrodes may be provided in addition to the electrode support described herein. In the embodiments discussed herein, the blank of material starts out in its raw form with an outer cylindrical, circumferential surface 112, preferably having a right circular cylindrical shape.

In the preferred embodiments, the transitions 106 are formed from the same material as the electrodes 102 and the support surface 110. the transitions 106 are preferably seamless between the electrodes and the respective support surface portions adjacent to transitions 106, without any welds, solder points, joints or other differences in the material between the electrodes 102 and the support surface 110. While it is possible that other materials may exist around the transition regions 106, it is preferred that at least part of the transition regions 106 be formed from the same material, and be seamless, joint-less and continuous. Other materials may exist around the transition regions, such as by welding, soldering, material deposition, or otherwise, but it is preferred that there by a sufficient percentage of continuous or seamless transition to reliably support the electrode and/or have a sufficiently low electrical resistance between the electrode and the conductive support. There is sufficient transition region to support the electrodes over the lifetime of the product, but a smaller transition region can be used for preliminary processing of the polarity block until such time as the transition region can be strengthened by other means, for example addition of more material or application of other supports. Likewise, a smaller transition region having a higher electrical resistance than optimum can be supplemented, for example by additional conductors.

In one embodiment, material is removed 114 (FIG. 3) to form an electrode extending longitudinally, preferably extending the length L of the polarity block. In the embodiment of the polarity block shown in FIGS. 6 and 7, the material will preferably be removed from portions of the polarity block radially outward of the respective electrodes. However, it should be understood that material can be removed from any number of parts of an electrode or precursor electrode, depending on the configuration of the original polarity block and its raw form, and the amount and location of the material to be removed will also be a function of the desired final form of the electrodes. For example, the material to be removed from the polarity blank depicted in FIGS. 6 and 7 will come primarily from portions radially outward from the electrodes. However, additional material can be removed from the tips 104 and/or the side surfaces 108 to further refine those surfaces, such as by electrode discharge machining.

In one embodiment of the inventions depicted in FIGS. 6–10, the final form of the electrodes are produced by removing some of the support material 110 and some of the transition region 106 around the outside of each of the electrodes so that at least one and preferably each of the electrodes is cantilevered and supported by the support material 110 is removed for a given length of the blank. Additionally, all or the desired portion of each of the transition regions 106 can be removed during the same process, and even outward portion of the electrode material can be removed, as desired. The amount of electrode material inward of the transition regions 106 to be removed will depend on the desired design for the final electrodes. The amount of material removed is preferably sufficient to expose the gaps between the electrodes, for example to accommodate the electrodes from the complementary polarity block, as described more fully below. The amount of material removed from the electrodes themselves may vary as a function of the radial gas conductance desired for the component. Radial gas conductance can be altered by exposing a shorter or longer radial gap between adjacent electrodes. the amount of material removed from the electrodes themselves may also vary as a function of the desired strength of the electrode. An electrode having a larger radial axis will be stronger and more able to withstand bending forces on any cantilevered portions of the electrodes, particularly for narrow electrodes.

The amount of the transition regions 106 to be removed will be related in part to the radial length of the electrodes, the shape of the transition region, and whether any inserts will be added between electrodes. In the preferred embodiment, the electrodes have side walls 108 extending straight radially.

In the preferred embodiment, the entire circumference of the support material 110 is removed for a given length of the blank so that all of the electrodes are supported in the same way and to the same extent. The entire circumference is removed also to minimize any differences from one electrode to another in their contribution to the electric field. However, it should be understood that the amount of support material 110 removed can be varied.

In one embodiment, material is also removed 116 (FIG. 3) from the blank while leaving sufficient support material 110 to form an electrode support 18. The electrode support 118 preferably extends longitudinally a second distance l less than the first distance L. The electrode support 118 serves as a support for at least one and preferably all of the electrodes in the polarity block. The electrode support 118 also preferably serves as an electrical contact and conductor for all of the electrodes so that one external conductor can be attached to the electrode support for each polarity block, and thereby providing a single bridge or electrical connection for all of the electrodes in a given polarity block. Multiple electrodes can then be energized from a common electrical source. The electrical source for all or part of the electrodes in a given polarity is also common. The electrode support 118 is integral with each of the electrodes, and the transitions from the electrode support 118 to each of the electrodes is preferably seamless and continuous. The electrode support 118 also provides structural integrity to the polarity block. It can be used to support the component, such as an ion guide, within the analyzer or other system, and it can be used to fix two polarity blocks relative to each other, in conjunction with the electrode support on the other polarity block. The electrode support 118 can also serve as part of a vacuum partition in a system.

In one preferred embodiment, for a given length of a polarity block 120 (FIG. 9), more support material 110 is removed along the length l' from one end 122 than along the length l" from the other end 124. The longitudinal length l' 126 of the exposed electrodes from the end 122 to the first end 128 of the electrode support 118 is greater than the longitudinal length l" 130 of the exposed electrodes from the end 124 to the second end 132 of the electrode support. The structure defining the electrode support 118 is closer to one end 124 than to the other end 122, but closer to the center of the polarity block than to the end. In one embodiment, the length of the electrode support is about 10 to 20 percent of the overall length of the polarity block while in another embodiment, the length l', one cantilever length, is preferably derived from several relationships. The length l' is preferably about half the total length L of the electrode, plus the spacing between the support surfaces 110 of the two polarity blocks, and plus any additional spacing desired to enhance radial gas conduction, if desired. If the support surfaces are not formed to be symmetrical about a center o the component, the cantilever length l' can be less than half of the total length L. The actual lengths will typically depend on the material used, the available diameter of the component, the application, the desired control over the axial gas conductance, the desired control over the vacuum pump requirements, and the like.

A polarity block can be effectively formed or produced as a monolithic structure. It can be formed from one blank of material by removing material, rather than only adding elements to a structure. While elements can be added tot he structure, as desired, the electrodes and the electrode support structure are preferably formed form a single type of material, from a single element, and without any substantial welding, brazing or attachment of electrode material. Common electrodes are electrically connected with a preferably single coupling surface or single coupling structure, such as in the transition region, so that one electrical connection per polarity can be used to energize all of the electrodes for that polarity.

The polarity block can be made from any number of materials. For example, titanium, glass such as quartz or Pyrex coated with gold, oxygen-free copper, aluminum coated with nickel, gold, chromium or a deposition coating of molybdenum. Other materials are possible as well, for example stainless steel, which may be drawn through a die or other suitable forming surface.

Figure 3:
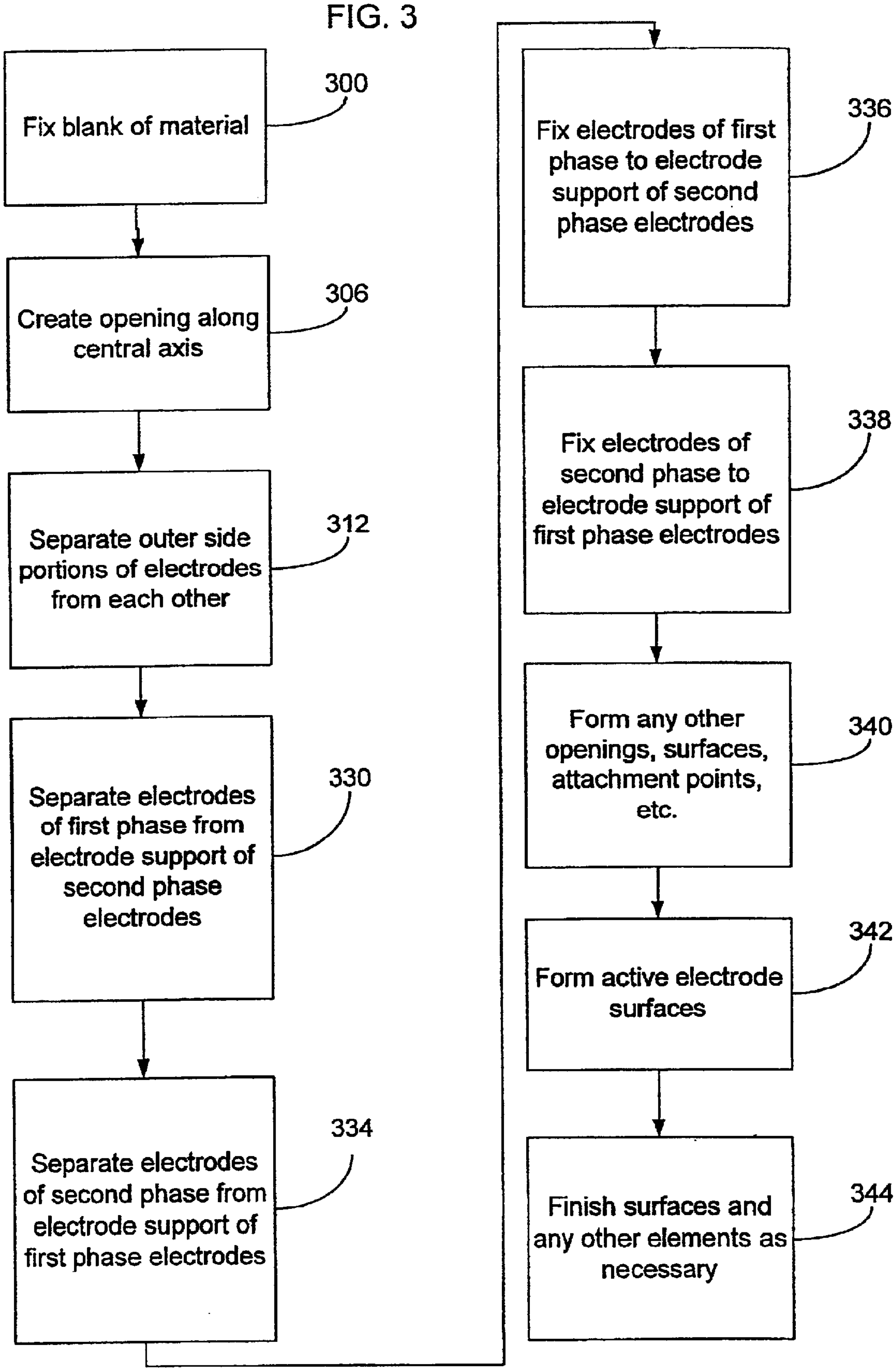
FIG. 3 is a flow chart depicting steps of a method for producing polarity blocks.
Figures 12, 13:
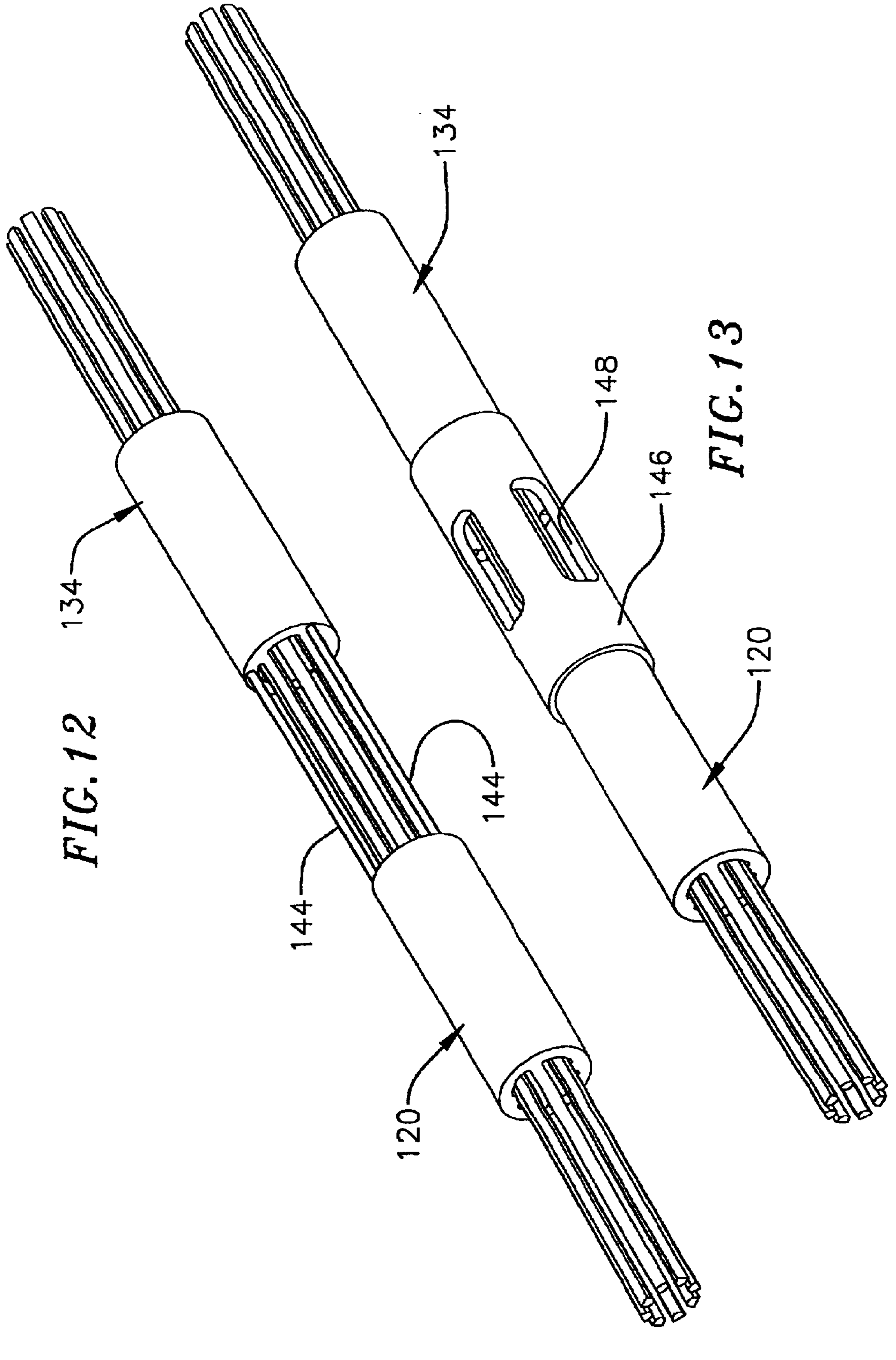
FIG. 12 is an isometric view of two nested polarity blanks forming a component such as an ion guide, with the polarity blanks fixed relative to each other by an insulating sleeve.
FIG. 13 is an isometric view of two nested polarity blanks forming a component such as an ion guide with the polarity blanks fixed relative to each other by an insulating sleeve.

In a preferred embodiment, a second polarity block 134 is provided by removing material from a second blank, preferably identical to the first blank, to form electrodes 136 and to form an electrode support 138 (FIG. 3). Preferably, the second polarity block 134 is structurally identical to the first polarity block 120 in all respects, except for the electrical connections. The second polarity block 134 is reversed in orientation and end-to-end and rotated the number of degrees equal to 360 divided by the total number of electrodes in the final device, relative to the first polarity block 120. The first and second polarity blocks are then nested 140 (FIG. 3) together so that the overall length of the combined polarity blocks is equal to the overall length of either polarity block, as depicted in FIGS. 12 and 13, and each electrode is spaced circumferentially equidistant from its respective adjacent electrodes. Each electrode of one polarity block will have an electrode from the other polarity block on each side. In the embodiment shown in FIGS. 8–11, the dual polarity block configuration allows assembly of eight electrodes through relatively easy manipulation of two elements, specifically the electrode support 118 and electrode support 138. Each electrode does not have to be manipulated individually, and separate electrical connections are not necessary for each electrode.

Once the first and second polarity blocks are properly aligned, the blocks are preferably rigidly fixed 142 (FIG. 3) relative to each other to ensure proper and reliable operation. The polarity blocks are positioned and fixed out of contact with each other and are maintained electrically insulated from each other. As shown in FIG. 12, the polarity blocks can be fixed using a joinder element, such as preferably rigid insulating rods such as three insulating rods 144, two of which are shown in FIG. 12. The insulating rods can be bonded, adhered, fastened or otherwise fixed to the respective electrode supports. The insulating rods could be plastic, for example polyetheretherketone or polyimide as Vespel®, or can be ceramic for wider spaces between electrode supports. In the preferred embodiment, the insulating rods extend longitudinally outside the electrodes.

In an alternative embodiment, the polarity blocks 120 and 134 can be fixed relative to each other with an insulating sleeve or cylinder 146 (FIG. 13). The sleeve 146 is bonded, adhered, fastened or otherwise fixed to the respective electrode supports. The sleeve may include walls 148 defining openings or apertures for allowing gas flow out of the sleeve. Other methods and structures can be used to fix the polarity blocks to each other.

The spacing between the first and second electrode supports on the respective polarity blocks can be almost any size, the maximum size possibly being limited by the strength of the insulating rods or sleeve holding the two polarity blocks rigidly with respect to each other. A smaller gap between supports allows lighter or smaller insulating rods, or a thinner sleeve, for example. Likewise, the sizes of each electrode support can vary as well, depending on the desired characteristics for the ion guide.

Figures 14, 15:
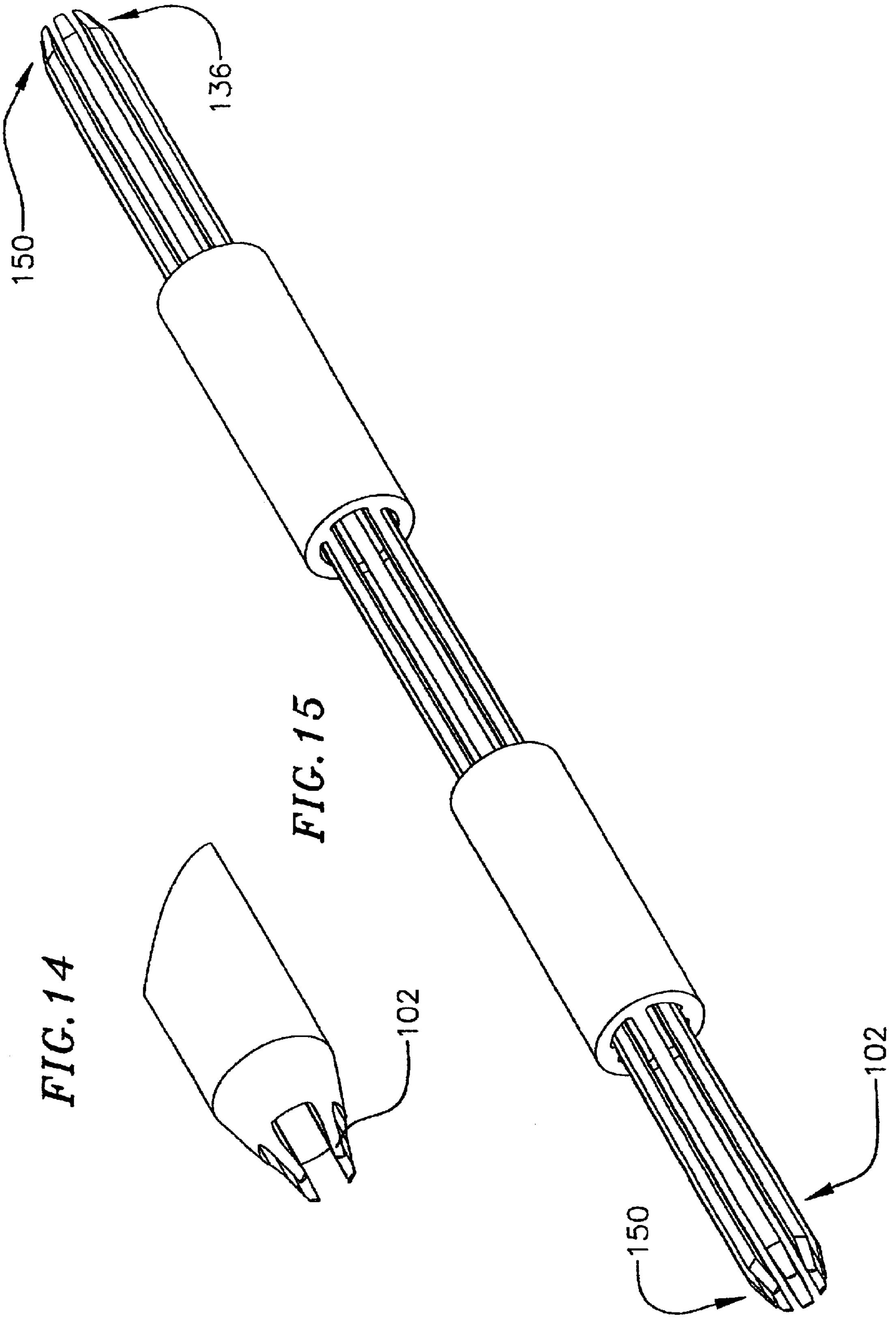
FIG. 14 is an isometric view of an end of a polarity blank showing the electrode ends tapered.
FIG. 15 is an isometric view of assembled polarity blanks having tapered ends with supporting material removed from portions of the electrodes.

The step 114 of removing material from the blank to form an electrode may include the step of changing the shape of the electrode. For example, the active surface of the electrode can be modified. Additionally, the outer shape of the electrodes can also be modified, as depicted in FIGS. 14 and 15. Each electrode 102 and 136 can have material removed to change the shape of the electrode, for example to form a taper 150 on the respective polarity block. Tapered ends on the component make it easier to assemble with other parts in the assembly, such as with entrance skimmers and/or exit lenses, especially where those other components are small in size, such as a half or one millimeter. Rather than tapering each electrode separately, all of the electrodes on a given polarity block can be modified simultaneously, thereby more easily matching the electrodes to the desired configuration, concentric with the taper on a lens element.

In one preferred embodiment, construction of a representative ion guide begins with two identical lengths of a metal extrusion, for example, having the profile shown in FIGS. 6 and 7. The material can be any conductive metal suitable for extrusion, for example aluminum. In one form of the inventions, each extrusion consists of a cylindrical tube having four inwardly-extending radial protrusions, in the case of an octapole, whose faces match or approximate the desired electrode surface of the ion guide. After being cut to the desired length, the outside diameters of each of the extrusions are turned down or machined to expose the gaps between the rods. A portion of the outside diameter of the extrusion is left intact, preferably near one end of the assembly, to provide mechanical support and/or electrical conductance between the elements. The outside diameter of the extrusion forms the conductive support for supporting and conductively coupling the corresponding electrodes. After both extrusions are processed, preferably identically, they are oriented to oppose one another and rotated 45 degrees relative to each other and nested into one another. In the preferred embodiment, an insulator or other structure is used between or about the two extrusions to maintain their alignment with respect to each other. Examples include insulating rods and a plastic or ceramic sleeve or sleeves, while preferably still providing sufficient vacuum conductance to pump out the gases escaping from the multipole.

One or both ends of the assembled multipole may be tapered in order to fit into a tapered lens element. The taper can be turned into the end of the extrusion at any time, but preferably prior to nesting of the two extrusions.

Figure 16:
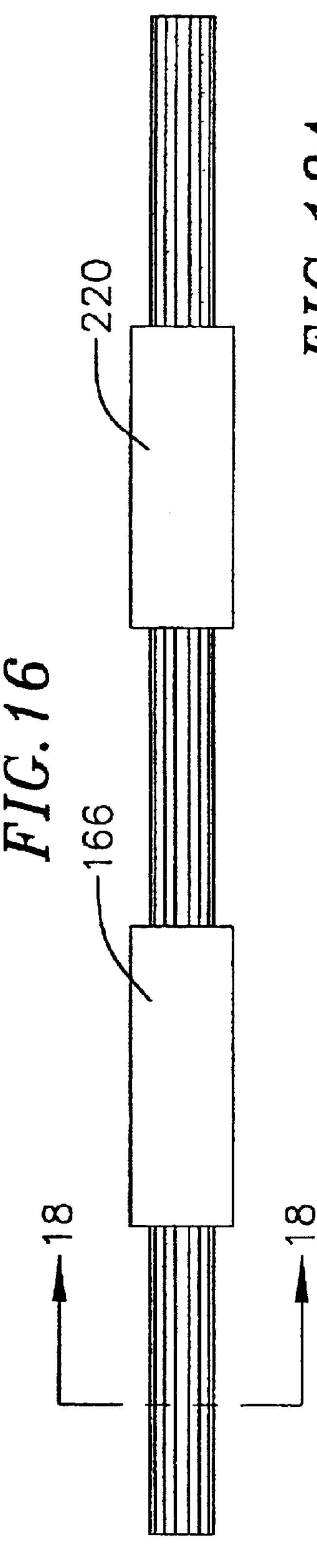
FIG. 16 is a side view of assembled and nested polarity blanks having electrodes with wedge shapes.
Figure 17:
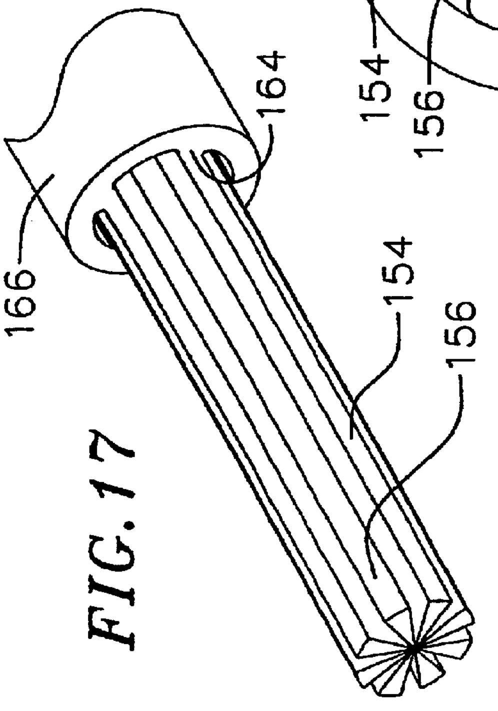
FIG. 17 is an isometric view of an end portion of the component of FIG. 16.
Figure 18A:
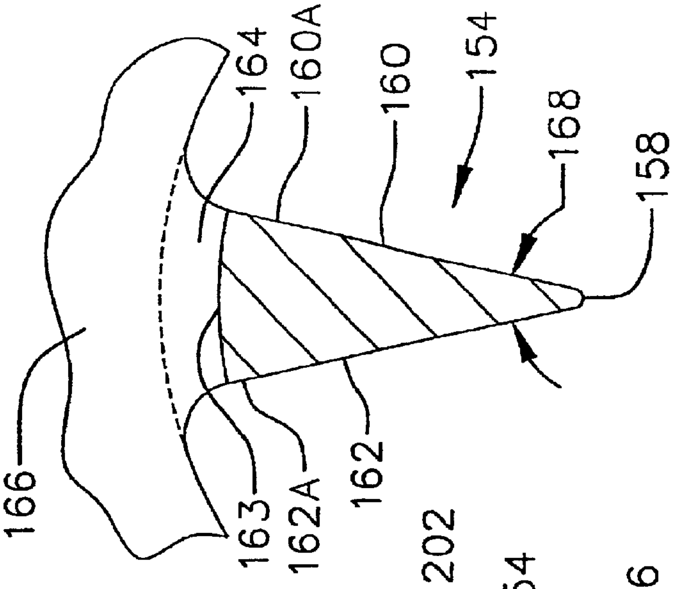
FIG. 18A is a detailed and partial cutaway of a portion of an electrode support and an electrode.
Figure 18:
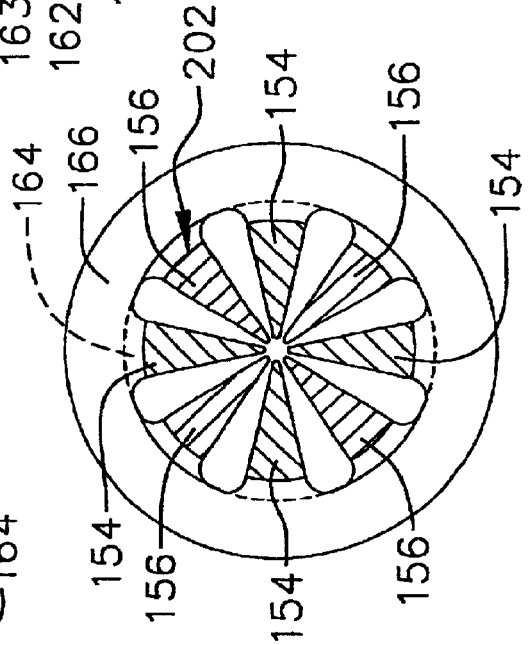
FIG. 18 is a transverse cross-section of the component of FIG. 16 taken on line 18—18 of FIG. 16.

In a further embodiment of one aspect of the present inventions, polarity blocks having an electrode and electrode support can be extruded using a conventional extrusion process to produce electrodes having a wide variety of configurations. The desired configuration of the electrodes can be designed 152 (FIG. 4) into an extrusion die. For example, a wedge-shaped electrode such as electrodes 154 and 156 (FIGS. 17 and 18), or any number of other electrode configurations, can be designed into an extrusion die. The component shown on FIGS. 16–18 is a component such as an ion guide, assembled from two 4-electrode polarity blocks to form an octapole. Each electrode 154 and 156 includes a point or active surface 158 (FIG. 18A) and first and second interior or side surfaces 160 and 162 diverging outwardly from the active surface 158 up to outer side surface portions 160A and 162A at an outer portion 163 adjacent the transition region 164. The transition region 164 joins the electrode 154 to the support material 166 and is preferably formed from the same material as the electrode, seamless and weld-free, and has a width and longitudinal or axial length sufficient to support the electrode 154 and/or minimize the electrical resistance between the support material 166 and electrode 154. The support material preferably couples adjacent electrodes of a given polarity to one another, so that a single electrical connection to the electrode support material can energize all of the electrodes at a given polarity. By extruding the polarity block, the material of the electrode, transition region and support material can be easily determined, and the dimensions of the electrode can be defined.

The radial length of electrode 154 is preferably selected so as to provide the desired Ro for the ion guide, and the radial length along with the width at the outer portion of the electrode at the transition region 164 help to determine the linear strength of electrode. Additionally, the angle 168 will determine the sharpness of the active electrode surface 158, and will also determine the spacing between adjacent electrodes, between the surface 162 of one electrode and the surface 160 of the adjacent electrode. That spacing will affect both the axial gas conductance and the radial gas conductance, all other things being equal. These aspects of the polarity block are easily factored into the design of an extrusion die.

The extrusion die is used in the conventional manner with an extrusion machine to extrude 170 (FIG. 4) a length of a polarity block as desired. The end of the block is faced 172, and support material 166 and transition region 164 material is removed 174 preferably as the material is extruded. Material is removed to the desired depth in accordance with conventional techniques. A centerpiece or other devices may be used to support the extrusion during the process. When the point on the longitudinal length of the polarity block is reached where the support surface begins, or where the depth of cut is otherwise reduced, removal of material is stopped or reduced 176, preferably to form the support surface over a predetermined longitudinal or linear length. Thereafter, support material and transition region material is further removed 178 approximately to the end of the polarity block, and the polarity block is severed and the end finished 180, as necessary. A heel of support material may be left on one or both ends of the polarity block to make easier the final working or removal of material along the polarity block and to face the ends. The heel can be an extra length of material to be removed from the final block, or can be turned down to the same extent as the rest of the exposed electrodes. In another preferred approach, the ends are tapered before turning down the outer diameter, through removal of support material and transition region material. Additionally, when the support is removed, it can be removed beginning from the ends and working toward the area that will be the support surface. The end of the next polarity block is faced 182 as the extrusion continues, and the steps 170–182 are repeated 184. The resulting polarity block then preferably has a plurality of electrodes all supported by the support element having the desired length and so that they are equidistant from and arranged symmetrically about a central axis. Substantial portions of the electrodes are cantilevered from the electrode support, but the support is preferably sufficiently substantial to adequately support the electrodes and to minimize the electrical resistance between each electrode and the attached conductor used to energize the electrodes.

Figure 5:
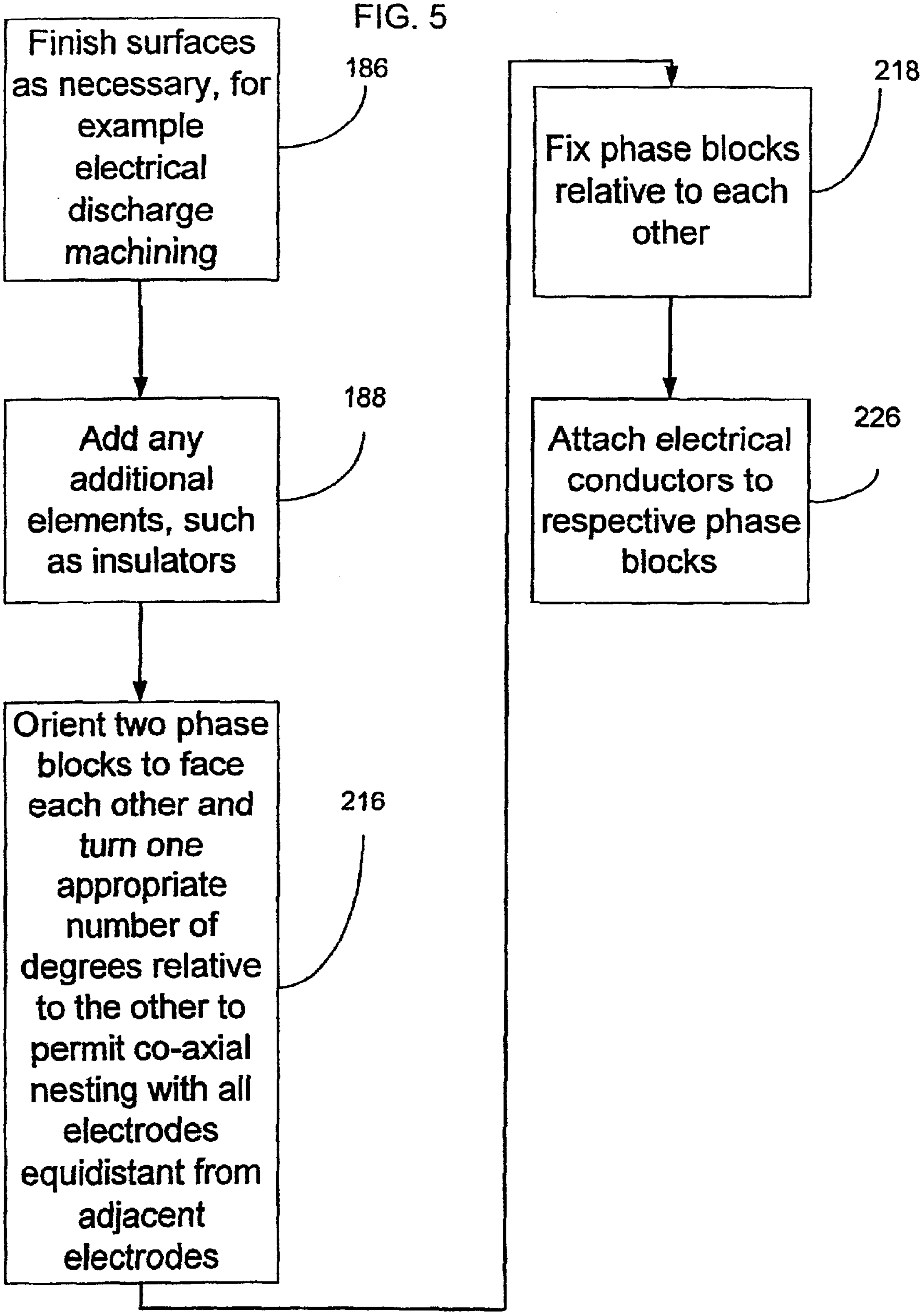
FIG. 5 is a flow chart depicting steps for finishing and assembling polarity blocks to produce a component for manipulating ions.

With two, preferably identical, polarity blocks, any further processing such as finishing surfaces 186 (FIG. 5), electrode discharge machining, for example, is carried out, and any additional elements such as insulators or insulating elements are added 188. Insulators 190 (FIGS. 19–22) can be used to modify axial and radial gas conductance. In the preferred embodiment, each insulator extends longitudinally and includes an inside surface 192 approximating or conforming to the shape of the external surface of the electrode. Where the insulator 190 extends only part way along the side surfaces 160 and 162, the inside radial walls 194 extend to the tips 196 a distance less than the radial length of the side surfaces 160 and 162. One advantage of decreasing the cross section open area, by adding insulator over a substantial length to reduce gas conductance by producing a low gas conductance tube, is to permit use of smaller pumps, thereby allowing desired pressure differentials to be produced using smaller pumps.

In the example of a wedge-shaped electrode, the inside surface 192 is preferably substantially wedge-shaped, and the outside walls 198 on the sides follow the shapes of the side surfaces of the electrodes to which they are adjacent. The outer most surfaces 200 approximate the shape of the gap 202 (FIG. 18) formed by the extrusion between adjacent electrodes, such as 204 and 206 in FIG. 21, in one polarity block to accommodate an inter-positioned electrode 208 from the other polarity block. First and second legs 210 and 212, respectively (FIG. 19), extend substantially radially from a bridge piece 214, extending substantially circumferentially between the first and second legs. The first and second legs extend at an angle from the bridge piece. In a preferred embodiment, each insulator is positioned about its respective electrode by sliding the insulator axially relative to the electrode.

Figures 19, 20, 21, 22:
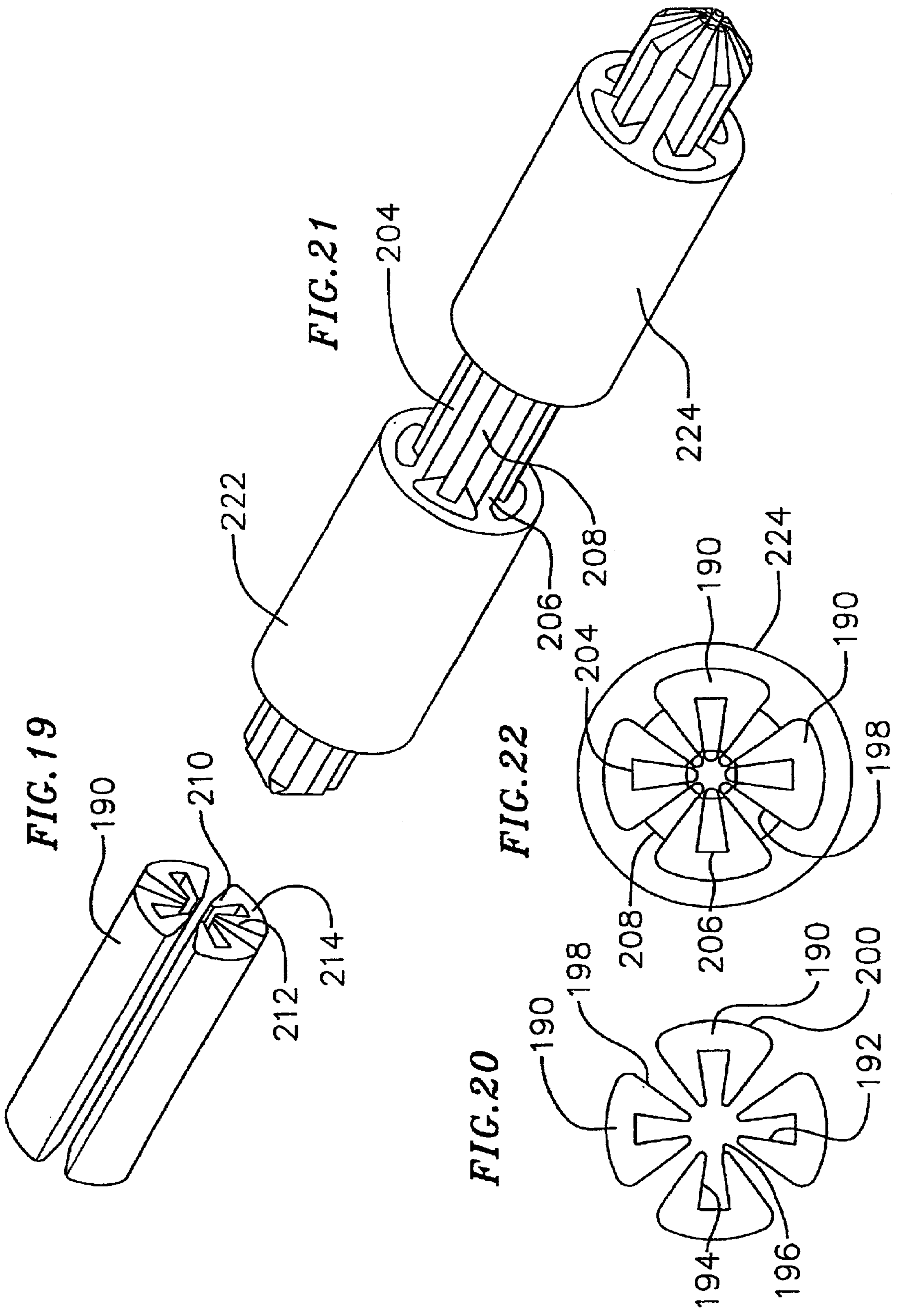
FIG. 19 is an isometric view of a set of insulators for use with electrodes of the component of FIGS. 16–18.
FIG. 20 is an end view of the insulators of FIG. 19.
FIG. 21 is an isometric view of the component of FIGS. 16–18 showing insulators inserted.
FIG. 22 is an end view of the component of FIG. 21.

Two polarity blocks are then oriented to face each other 216, so as to be coaxial, and one is turned relative to the other an amount sufficient to permit coaxial nesting of the electrodes between each other. Preferably, all electrodes are equidistant from each other, define a constant radius Ro and are relatively rigid. The polarity blocks are then fixed 218 relative to each other, such as by insulating rods or an insulating sleeve. FIG. 16 shows a first polarity block with its electrode support 166 and a second polarity block with its corresponding electrode support 220. FIG. 21 shows a first polarity block with a corresponding electrode support 222 and a second polarity block with a corresponding electrode support 224. Appropriate electrical conductors can then be attached 226 (FIG. 5) to the respective polarity blocks, and the component assembled into an analyzer or other assembly.

Figure 23:
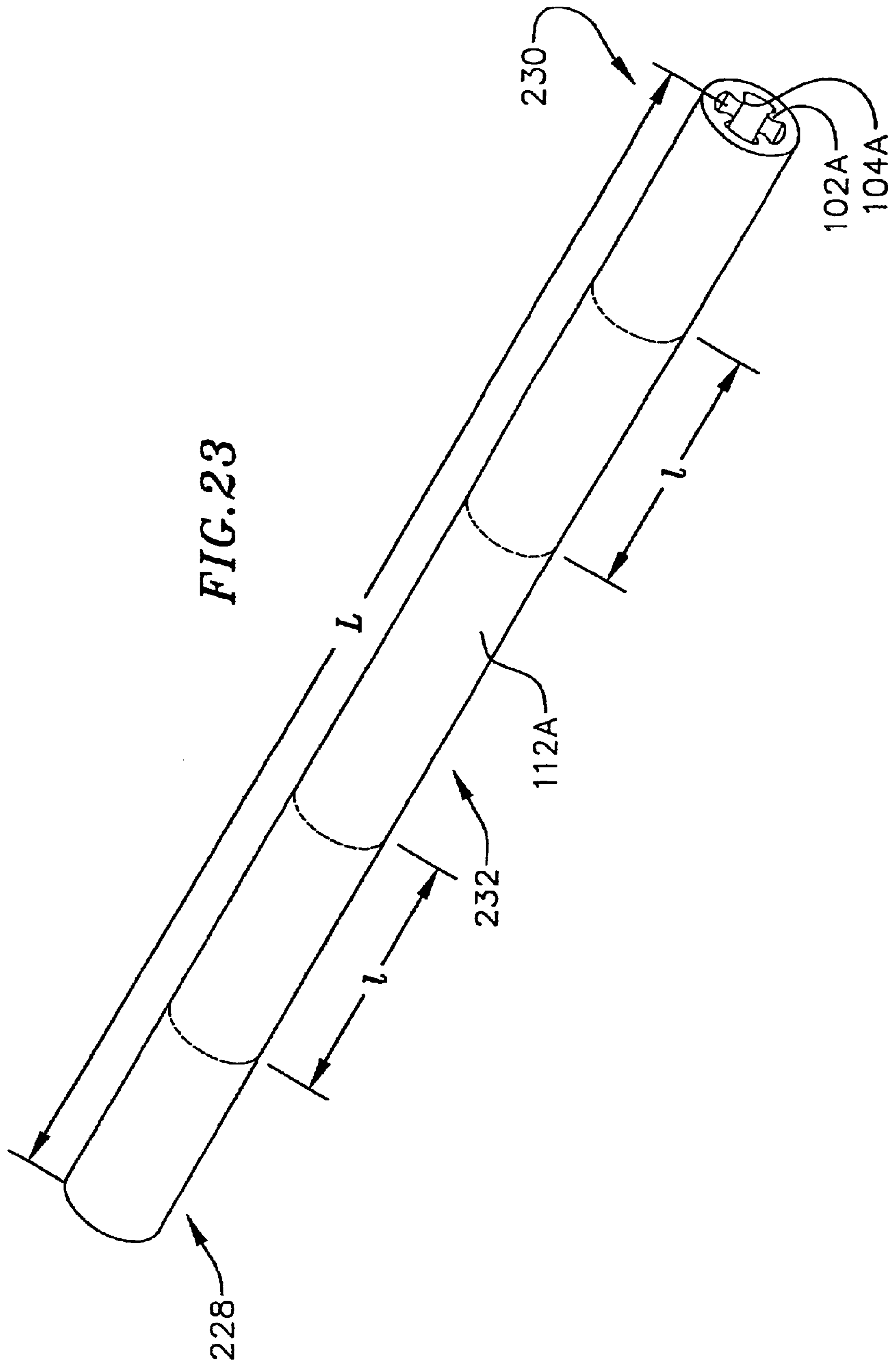
FIG. 23 is an isometric view of an extruded polarity blank for use, for example, as a monolithic blank for the set of poles of an ion guide, before supporting material has been removed.
Figures 24, 25:
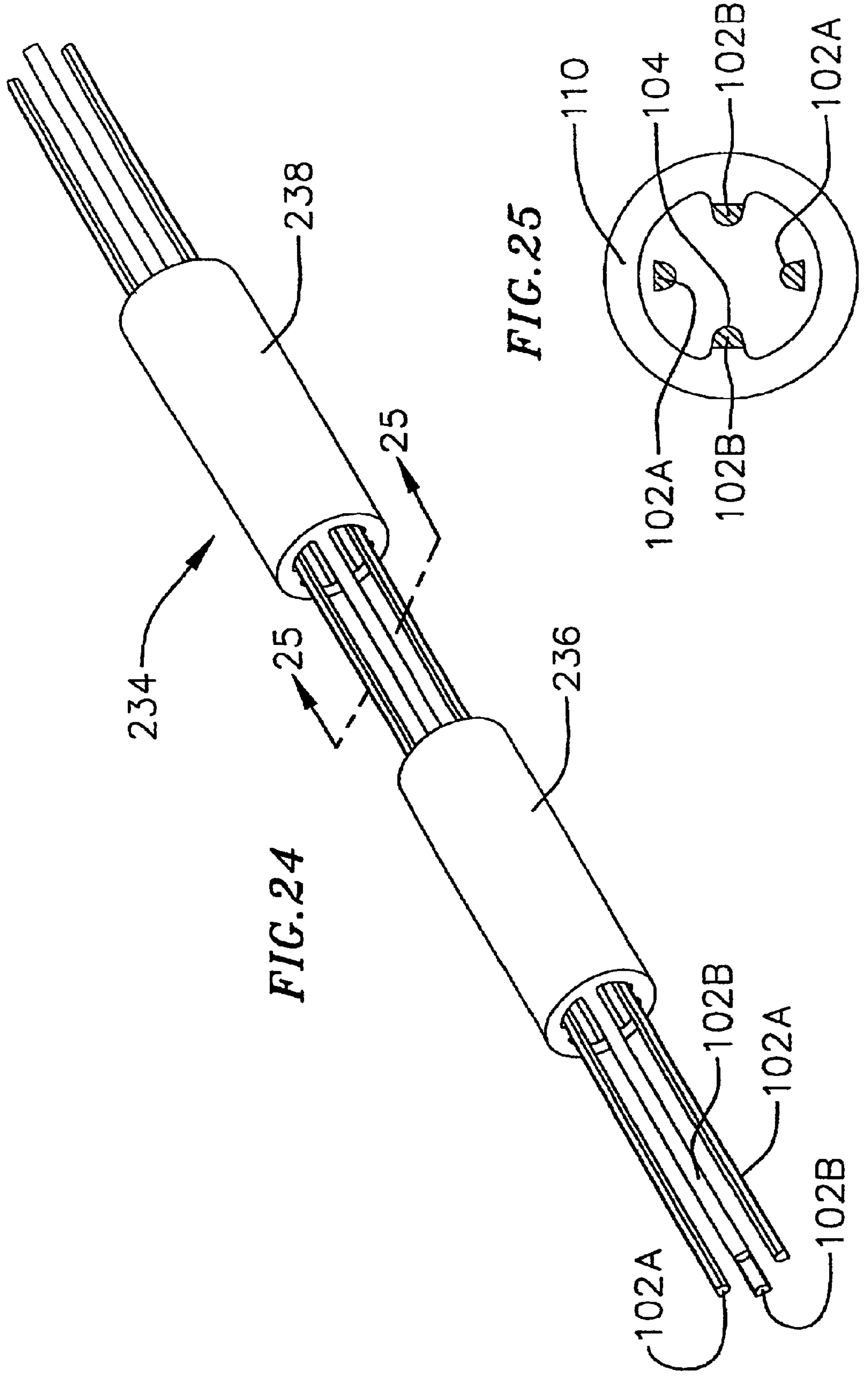
FIG. 24 is an isometric view of a multipole blank having supporting material removed to expose cantilevered electrodes.
FIG. 25 is a transverse cross sectional view of the multipole blank of FIG. 24.

In accordance with another aspect of one of the present inventions, a blank of material (FIG. 23) can be produced having electrodes 102A with respective tips 104A formed on the interior of the circumferential surface 112. The blank can be formed by extrusion, machining or other forming processes, that may be selected as a function of the size of the blank, the material, the cost and the like. The blank can be turned down to remove material, such as by machining or otherwise, at each end 228 and 230 and at an intermediate portion 232 to form a still monolithic structure 234 (FIG. 24). The structure 234 has a first electrode support 236 and a second electrode support 238 and four electrodes 102, to be considered as two pair of electrodes, each of two oppositely facing electrodes forming a pair 102A and 102B. The electrode supports are then fixed relative to each other, such as by an insulating sleeve or longitudinally extending insulating rods, similar or identical to those described previously (not shown in FIG. 24). The electrodes 102B can then be separated from the opposite electrode support 236, and electrodes 102A can then be separated from the opposite electrode support 238 to form a quadrupole assembly. The electrodes can be separated in a number of ways, such as machining, plunge EDM, or other ways, that may also be selected as a function of the size of the blank, the material, the cost and the like. In this way, a multipole component having two ro more polarity blocks can be formed from a single monolithic blank of material, the electrodes formed while each is fixed relative to the other electrodes, and the electrode supports fixed relative to each other while the respective electrodes remain in their proper positions. The final electrode surfaces can be finished, if desired, such as by EDM or other suitable processes.

It will be understood that the electrodes and the electrode supports can take any number of configurations, including a variety of shapes, sizes and spacing relative to each other. It will also be apparent that components that can be produced in accordance with one or more aspects of the present inventions, such as from a single monolithic structure, can also be produced in accordance with other aspects of the present inventions, such as from two polarity blocks nested together to form a single assembly. In the latter example of two polarity blocks, each of the blocks can be formed from a single monolithic structure, such as by extrusion, molding, casting, or machining.

In another aspect of one or more of the present inventions, one or more polarity blocks 240 (FIG. 26) can be formed separately to be combined with other elements to form a multipole component. The other elements may be other electrode combinations, but are preferably similarly formed polarity blocks that are complementary with each other and are nested together and fixed relative to each other to form the multipole component.

In one preferred embodiment, the polarity block 240 is a monolithic structure of substantially the same material. The structure will have a continuous, uninterrupted path of the same material from an electrode support such as ring 242 to at least one and preferably each of the electrodes 244 and 246. While the structure may have other materials on surfaces of the electrodes and/or of the ring, each electrode preferably has at least one area forming a continuous, uninterrupted path of the same material between the electrode support and the electrode. Other materials may include metal coatings, brazing, and the like. However, it is preferred that there be a substantial amount of identical material coupling and connecting the ring and the electrodes. For example, each of the electrodes, such as electrode 244, may be considered to have a transition region 248 having an axial thickness and an arcuate length. The transition region 248 is the same material as the electrode 244 and the ring 242.

Figure 26:
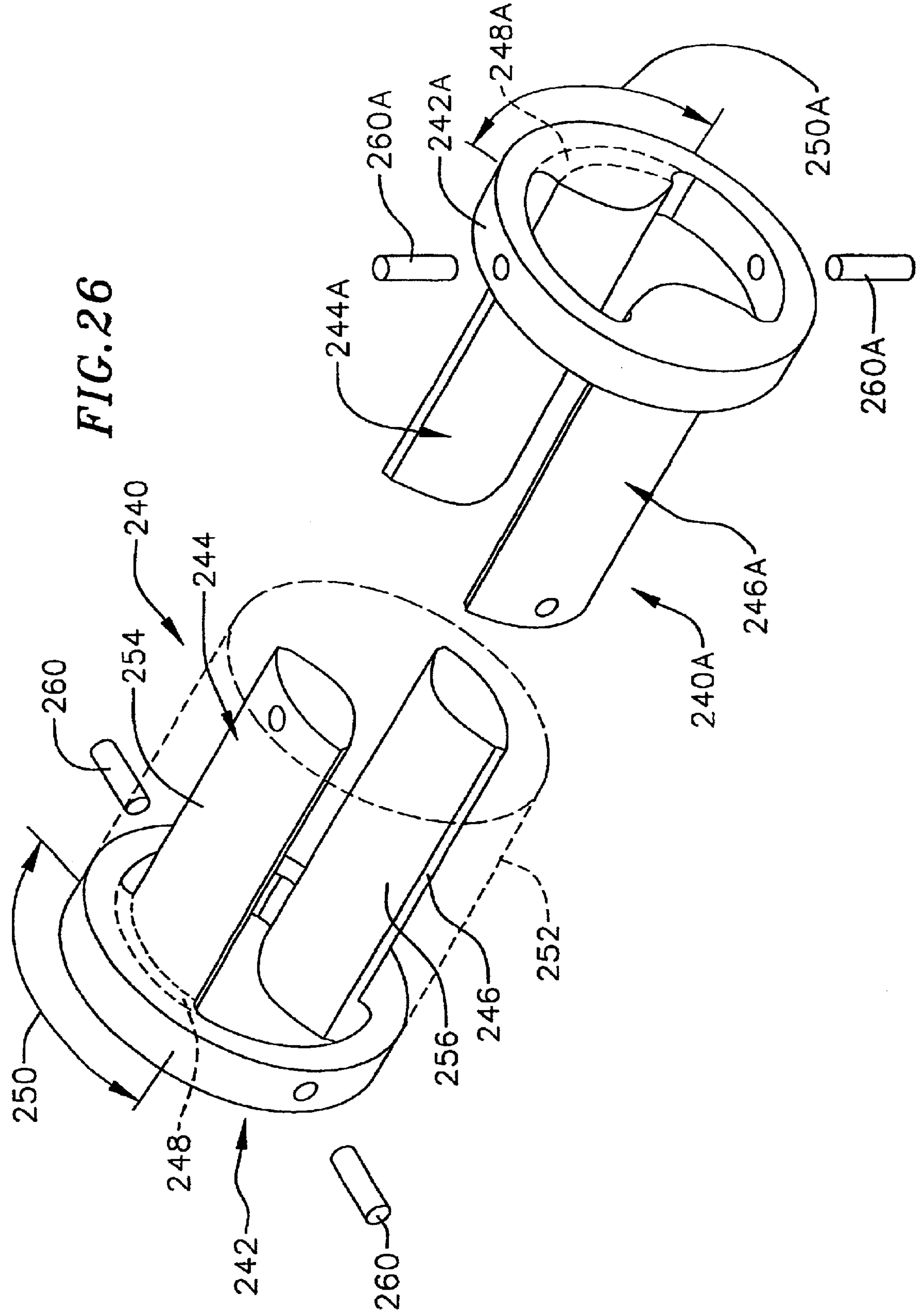

In other preferred embodiment, at least one electrode 244 and preferably each of the electrodes is coupled to and supported by the ring 242 over an arcuate length defined by an angle 250 less than 180 degrees, and preferably substantially less than that angle. In the configuration shown in FIG. 26, the transition region 248 occupies a relatively small angle compared to the entire perimeter of the electrode 244. The transition region 248 in the embodiment shown in FIG. 26 is entirely on the opposite side of the electrode from the central axis of the polarity block. Additionally, the angle defined by the arcuate length of the transition region can be less than that defined by the maximum arcuate length of the electrode.

In another aspect of one or more of the present inventions, the polarity blocks shown in solid lines in FIG. 26 can be formed in a number of ways. Each polarity block can be formed by molding, casting or machining. In the case of molding or casting, most of the shape of the polarity block can be defined in the mold or casting. Molding and casting can be used to efficiently produced polarity blocks of the desired configuration. Complementary polarity blocks can then be assembled and fixed according to the desired method.

In the case of machining, a blank 252 such as that represented by the dashed lines in FIG. 26 can be machined to remove one or more outer portions of material, for example to define the electrode support. Removal of outer portions of the material may also serve to define outer surface portions 254 of the electrodes. The blank 252 can also be machined to remove material portions to define electrode surfaces, such as the electrode surface 256. Typically, the electrode surfaces will be defined by removal of interior portions of blank material, such is that material that would be removed to define the Ro of the final component. Interior material can also be removed during a final finishing process after each of the polarity blocks are fixed relative to each other.

A complementary polarity block 240A is preferably, though need not be, formed in the same way as polarity block 240. Identical elements are numbered identically with the letter "A" appended. The polarity blocks can be nested relative to the other to form a multipole component 258 (FIG. 27) for use in manipulating or controlling ions. The polarity blocks can be rigidly fixed with respect to each other through insulating elements such as electrically insulated retaining pins 260 and 260A. In the embodiment shown in FIG. 26, the retaining pins 260 and 260A are oriented radially between the polarity blocks. The retaining pins can also be oriented axially, as discussed more fully herein, or in other orientations. In the embodiments shown in FIGS. 26 and 27, the electrodes 244 and 246 are oriented symmetrically with respect to electrode 244A and 246A in the opposite polarity block, and the free ends of those electrodes are nested within and encircled by the ring 242A. The pins 260A rigidly fix the electrodes 244 and 246 relative to the ring 242A of the opposite polarity block. The pins 260 rigidly fix electrodes 244A and 246A relative to the ring 242 of the opposite polarity block. In the embodiment shown in FIG. 27, the ends of the electrodes 244 and 246 are flush with the outer most surface 262 of the second polarity block 204A. As will be seen in other embodiments discussed herein, the ends of each of the electrodes can extend through and beyond the support elements of the opposite polarity blocks. Additionally, the ends of each of the electrodes can stop short of the outer most surfaces of the opposite polarity blocks, and can even stop short of being encircled by the ring of the opposite polarity block.

Figure 27:
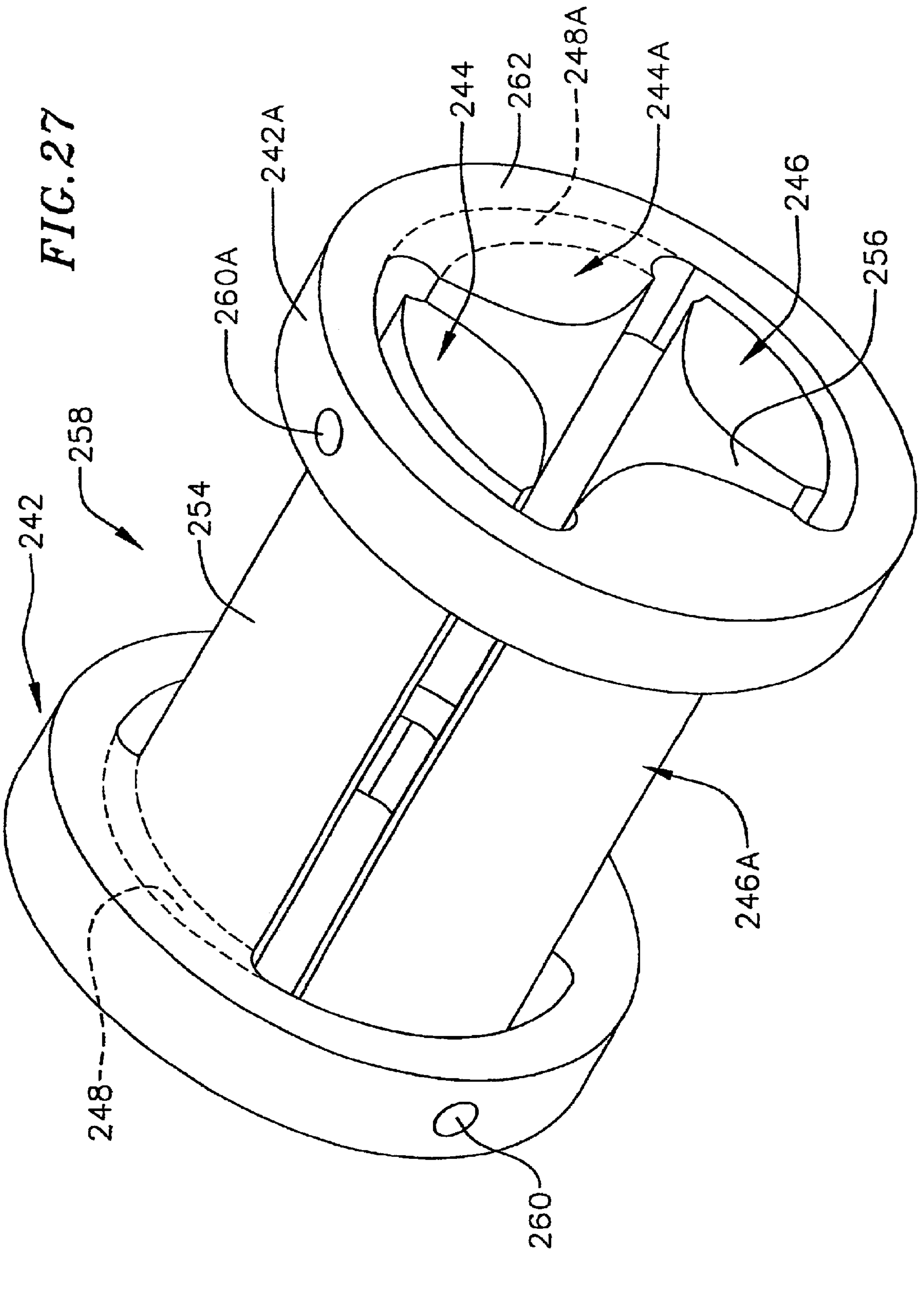
FIG. 27 is an isometric view of a multipole component.

In another aspect of one of the present inventions, the multipole component 258 shown in FIG. 27 can be formed from a single blank of material, for example, so that the nesting of the polarity blocks is already built into the structure. Defining the electrode supports 242 and 242A and the individual electrodes can be accomplished by machining or other processing methods. In one preferred process, the single blank of material may take the form of a cylindrical blank represented by the polarity blank in the left of FIG. 26 represented by the ring 242 and the dashed lines 252. Material can be removed, such as by machining, form an intermediate portion of the blank to define the electrode support rings 242 and 242A. the depth of machining at the intermediate portion of the blank may be used to define the outer surfaces of the electrodes. Transition material between the electrode 242A can be removed by machining to separate the electrode 244 from the ring 242A. Transition material between the electrode 246 and the ring 242A removed by machining to separate electrode 246 from the ring. The same methods can be used to remove transition material from between the electrodes 244A and 246A from the ring 242. Insulating pins can then be used to rigidly fix the two polarity blocks relative to each other. The remaining surfaces of the electrodes can be defined by appropriate machining to remove internal material from the electrode blank. For high precision components, electrode discharge machining can be used to define and finish the electrode surfaces. In this aspect as well, each of the polarity blocks are preferably monolithic structures, and the electrodes and their respective supports are formed from the same material with a continuous, uninterrupted path of the same material from the support to the respective electrodes. The electrodes are supported in such a way that the electrode support contacts its respective electrode over an arc of less than 180 degrees.

In a further preferred form of one aspect of the present inventions, electrodes extend on each side of respective electrode supports, and polarity blocks are rigidly fixed relative to each other through axial supports (FIGS. 28–32). One or each of the electrode supports can be located at a number of axial positions on the component. Additionally, insulating pins or other elements for fixing the polarity blocks relative to each other can be oriented axially so that differences in coefficients of thermal expansion between the electrodes, rings or bridges and the insulating pins would preferably translate more into an axial shift rather than a radial shift. Radial shirts due to thermal expansion could potentially shift the Ro of the pole pair. As in other embodiments, the insulators are located on the back sides of the electrodes, out of the line of sight of the electrical field defining the ion trajectory. Consequently, the possibility of any electrical charge on a ceramic insulating pin or other component affecting the desired field and the ion trajectory can be reduced.

Figures 28, 29, 30:
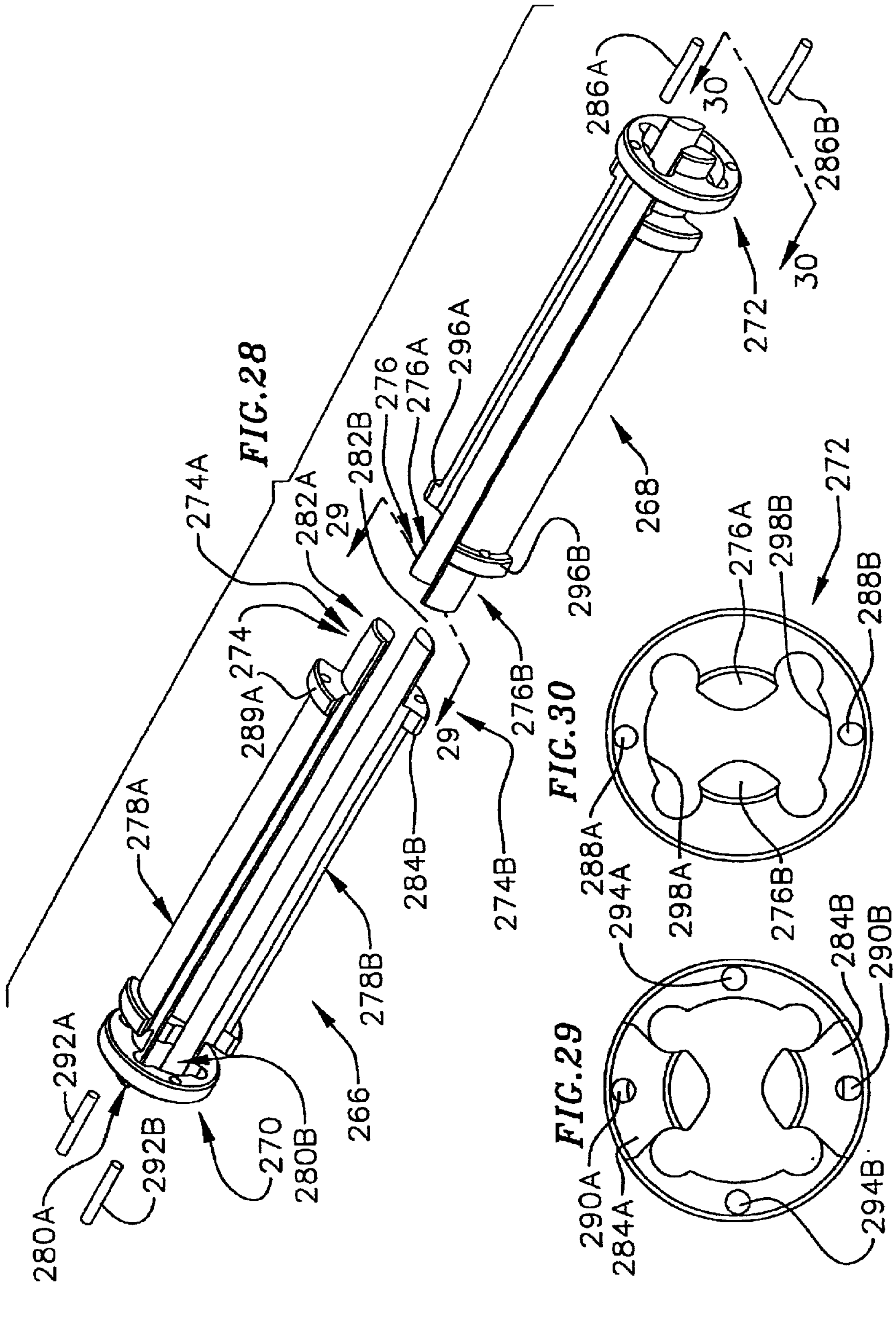
FIG. 28 is an exploded isometric view of a pair of polarity blanks in accordance with further aspects of the present inventions, such as may be made through molding, casting, machining, and the like, showing axial insulating pins, and electrodes extending beyond the electrode supports.
FIG. 29 is an end view of one polarity blank of FIG. 28 taken along lines 29—29 of FIG. 28.
FIG. 30 is an end view of the other polarity blank of FIG. 28 taken along lines 30—30 of FIG. 28.
Figures 31, 32:
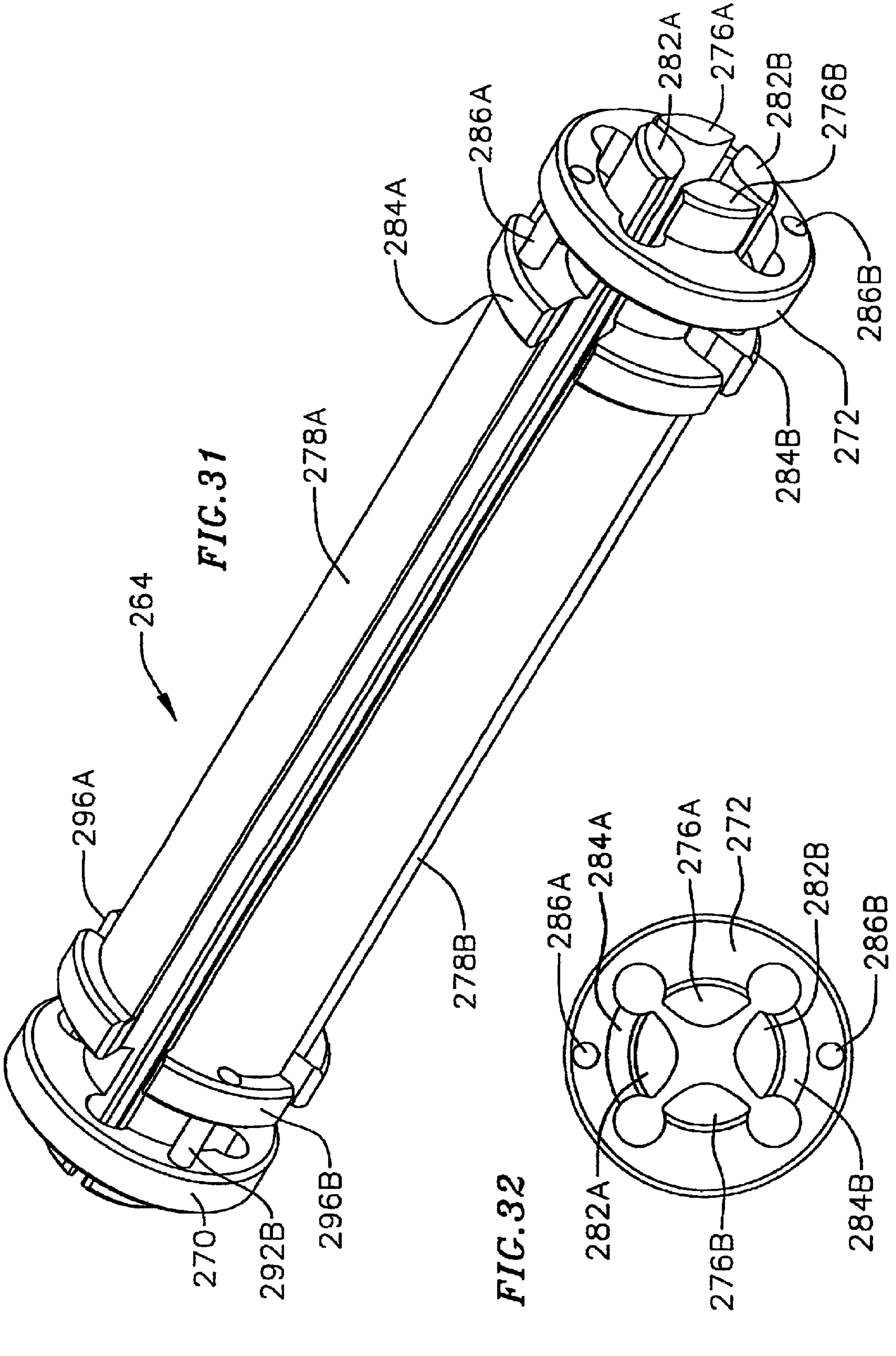
FIG. 31 is an isometric view of a multipole component having polarity blocks like those shown in FIGS. 28–30.
FIG. 32 is an end view of the component of FIG. 31 taken along lines 32—32 in FIG. 31.

The multipole component 264 shown in FIG. 31 can be most easily visualized by considering the two pole pairs or polarity blocks 266 and 268 in FIG. 28 shown in an exploded view for convenience. Each polarity block includes a respective electrode support in the form of a ring 270 and 272, respectively, and electrode pairs 274 and 276, respectively. The first electrode pair 274 has respective electrodes 274A and 274B. While this description is for a quadrupole, it should be understood that other multipole elements would have a similar description.

In a preferred embodiment, each electrode pair includes an intermediate electrode portion 278A and 278B, supported end portions 280A and 280B and nested end portions 282A and 282B, the term "nested" intended to refer to the ultimate positioning of those end portions nested within the adjacent ring 272. It should be understood that the term "intermediate" is used to refer to portions of the electrodes in FIG. 28 that are intermediate the electrode supports 270 and 272. However, other configurations of the polarity blocks may not have intermediate electrode portions with the same appearance, dimensions and positioning relative to the other elements of the polarity block. The electrodes include active electrode surfaces extending the entire axial length of the electrodes 274A and 274B from the nested end portions to the supported end portions. While the lengths of the end portions can vary, the end portions shown in FIG. 28 and FIG. 31 extend beyond the electrode supports. The nested electrode end portions have a radial dimension tat is less than the greatest radial dimension for the electrode so that the end portions can easily extend through and clear the surrounding ring 272 of the opposite polarity block, minimizing any electrical influence on the nested electrodes from the adjacent ring 272. The shapes and sizes of the end portions of the electrodes are preferably identical.

In the embodiment shown in FIG. 28–31, each electrode includes an anchor block 284A and 284B. The anchor blocks support and fix one end of respective insulating pins 286A and 286B, for fixing the first and second polarity blocks relative to each other. The insulating pins are anchored in holes 288A and 288B in the second polarity block 268 (FIG. 30) and also in holes 290A and 290B in the anchor blocks 284A–B (FIG. 29). The anchor blocks can take any number of configurations, and can be positioned and dimensioned as desired to reliably fix the polarity blocks. In the embodiment shown in FIG. 28 and FIG. 31, the anchor blocks are spaced a suitable distance inward from the corresponding ring 272 to ensure adequate electrical insulation between the ring 272 and the adjacent anchor blocks. Insulating pins 292A and 292B are fixed in and extend through respective holes 294A and 294B in the ring 270 and are also fixed in corresponding anchor blocks 296A and 296B.

Preferably, the polarity blocks 266 and 268 are formed from a monolithic blank of material. The electrodes, the rings and the anchor blocks can be formed while all of the individual elements of the component are fixed relative to each other. For example, the rings 270 and 272 can be formed, preferably first, by removing material from each side of the respective rings entirely around the perimeter of the blank adjacent the respective rings. The width and depth of material removed can be selected as desired. The width of material removed from each end back to the corresponding ring will depend on how much of an extension or snout is desired for the supported electrode end portions and the adjacent nested electrode end portions. The width of material removed behind each ring may be determined by the spacing desired for adequate insulation, the strength of the insulating pins, the overall length of the component, and the like.

Additional outer material can be removed to define the outer portions of the electrodes, as desired, and to form the anchor blocks 284 and 296. Preferably, the cross-sectional areas of the electrodes are small while the sizes and configurations of the anchor blocks are sufficient to reliably fix the two polarity blocks 266 and 268 relative to each other.

Additional outer material that is preferably removed includes material radially outward of the nested electrode end portions 282A and 282B and the opposite inside surfaces 298A and B of the surrounding ring 272. Removal of this bridge material, which originally bridges the ring 272 and the opposite nested electrode end portions 282A and 282B, electrically isolates the outer surfaces of the nested electrode end portions from the ring 272. Thereafter, all that preferably remains to electrically isolate the electrodes of opposite polarity blocks is to remove the internal material between the respective electrodes.

At each of the stages described, the two polarity blocks are fixed relative to each other. Before the electrodes of the polarity blocks are electrically isolated, the insulating pins are preferably fixed in place so that the two polarity blocks will thereafter be rigidly fixed relative to each other. Once fixed with the insulating pins or otherwise, any subsequent machining to remove internal material can be carried out without disturbing the relative positioning of the two polarity blocks.

In a preferred embodiment, removal of outer material from the outer portions of the electrodes and removal of outer material between each ring and the adjacent nested electrode end portions is sufficient to allow an EDM wire to extend the entire length of the component and interior to each of the surfaces 298A and B. The EDM wire can then be used to remove internal material to define and preferably finish the final electrode surfaces. Other machining techniques can also be used.

Multipole components are more easily and precisely manufactured using the methods and configurations described herein. Individual assembly of electrodes can be minimized or entirely eliminated. Additionally, the relationships between electrodes can be maintained along the entire length of the electrodes without interruption by ceramic mounts. Consequently, the creation and/or maintenance of the desired electric field is improved while minimizing possible field effects resulting from exposed ceramics. The ceramics can be nested into the rings. Glass or other insulating material can also be used.

The insulating pins can take any number of forms, including cylindrical rods, rectangular pegs, along with ceramic, glass or other insulating washers, rings, sleeves, and the like. For electrical and field considerations, a gap of one to 1.5 mm or more is preferred between the rings and the anchor portions. Tooling shim stock of the desired gap dimensions can also be used and removed after securing the pins in place.

If metal pins are used in combination with ceramic or glass, the pins can also be used to provide electrical connection to the multipoles. Ceramic discs or washers can be used instead of pins and can be secured in place by brazing or other suitable techniques. Ceramics can be nested into the rings and/or anchor plates. Pins can be shorted to the multipole material or to the rings to dissipate any accumulated charge.

Coefficients of thermal expansion can be accommodated by suitable selection of materials. Materials having low coefficients of thermal expansion, such as tungsten carbide can be used for the electrode blank. Tungsten carbide can be formulated having coefficients of thermal expansion that more closely match that of a ceramic.

A quadrupole mass filter or other multi-electrode component, such as may be used in a mass analyzer, can be made in a number of ways in accordance with one or more aspects of the present inventions. In one preferred embodiment, a blank of material is provided that can be used to produce a polarity block. The phrase "polarity block" will be used herein to refer to a precursor or final element or elements to be used to produce an electric field having the same polarity In the preferred embodiment, each of the polarity blocks used to form a final component, for example a quadrupole mass filter, will be identical to each other in form, structure and dimension, while various differences in openings and external surfaces may exist without departing from the inventions. Typically, two blocks will be oriented and fixed relative to each other to form the desired component. However, it should be understood that one or more aspects of the inventions can be adopted even when one polarity block is different from the other, when more than two polarity blocks are used in a single component or when two polarity blocks are made in different ways or with different configurations.

The blank of material may have been created by suitable preliminary processes, but in the preferred embodiments discussed herein, the blank of material will be formed from a material that can be used for electrodes, for example materials presently used for quadrupole mass spectrometer electrodes. The electrode or electrodes and the polarity block of which they are a part can be presented in any stage of preparation, whether as part of an un-cut blank without electrodes defined, or with some or all of the electrodes formed, for example. However, the electrodes are preferably integral with their respective electrode supports. the processing can be carried out at different times, such as the conventional metal machining first and the more precise EDM of the electrode surfaces later, for example, but it is preferred that the electrodes are finally formed after the electrodes and their respective supports are fixed relative to each other. A preferred embodiment of one aspect of the present inventions where processing starts with a cylindrical blank of material will be described in more detail below.

Figure 33:
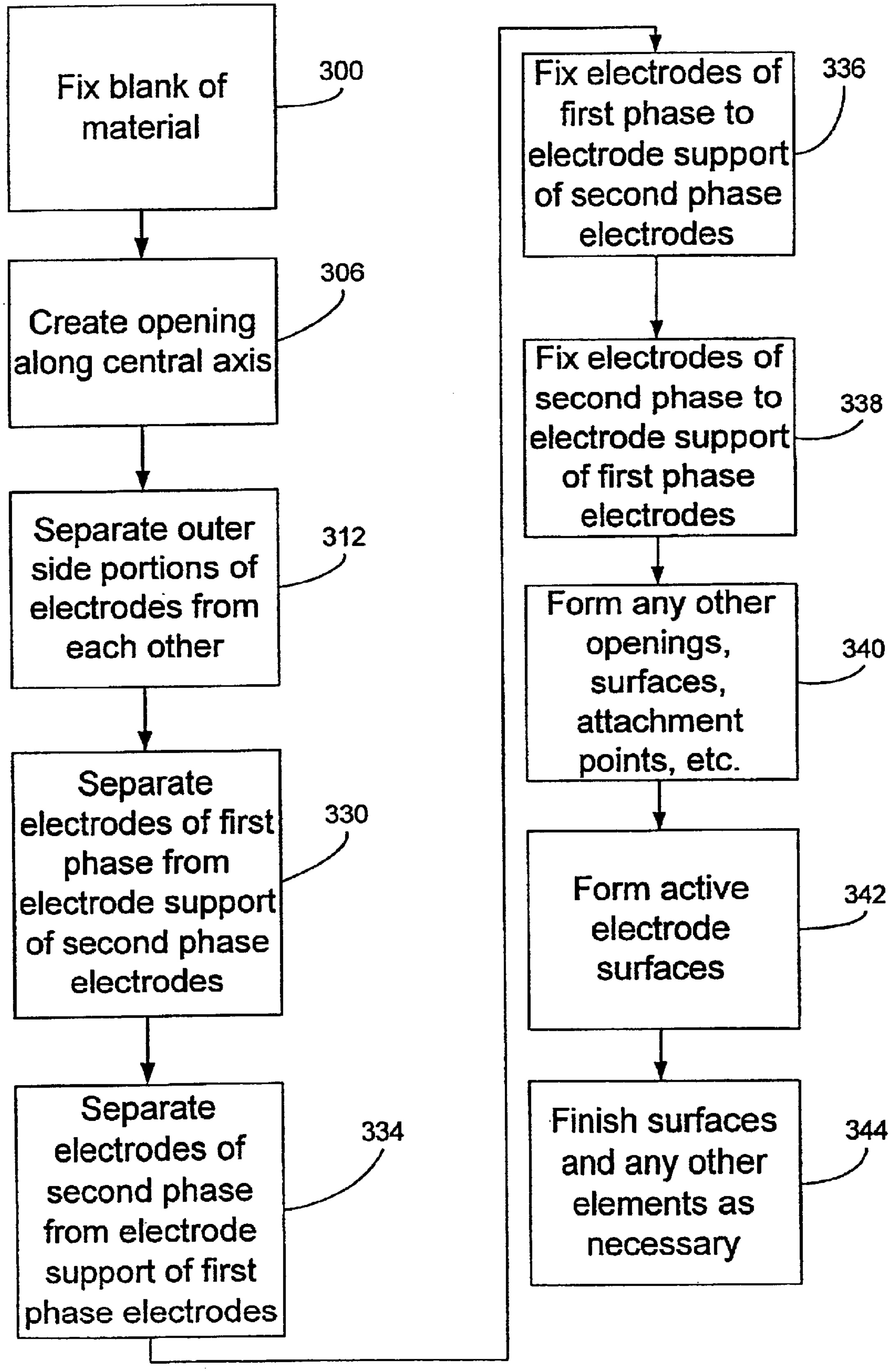
FIG. 33 is a flow chart depicting steps of a method for producing a multipole device in accordance with one aspect of one of the present inventions.

The blank of material is preferably a cylindrical length of conductive material of a quality and finish of conventional electrode precursor material. It will be modified to include openings or other surfaces for fixing 300 (FIG. 33) the blank for working. In the embodiments discussed herein, the blank of material starts out in its raw form with an outer cylindrical, circumferential surface, preferably having a right circular cylindrical shape. The outer surfaces may be finished as desired, but final finishing of at least those surfaces exposed to ions of interest will typically be left to the end. It should also be understood that the sequence of the steps of producing the multipole device of the present inventions as described is one preferred sequence, but that different orders of processing can be used while still taking advantage of one or more of the benefits of the present inventions.

After fixing the blank of material, a first central bore 304 (FIG. 35) is created 306 and which is defined by a substantially cylindrical wall 308 extending coaxially with a central axis 310. the central axis 310 is intended to refer to the central axis relative to the final electrodes, and will be coaxial with the Z-axis 42. Under some circumstances, the central axis 310 may not always be selected to be equidistant from the outer surfaces of the cylinder, but the electrode surfaces are preferably formed based on the location of the central axis 310. The diameter of the bore 304 is preferably such as to leave sufficient material for later, more precise machining to allow formation of the electrode surfaces as desired.

Subsequent steps are then used to remove material and/or define the various elements of the multipole device. The electrodes will be separated from each other, and one polarity block will be electrically isolated from all other polarity blocks. The polarity blocks will also be fixed relative to each other, preferably prior to the final formation of the electrode surfaces. In one preferred embodiment, the outer portions of the electrodes are separated 312 from each other. In the embodiment shown in FIG. 35, a first pair of electrodes 314 and 316 have outer portions 318 and 320, respectively, and a second pair of electrodes 322 and 324 include outer portions 326 and 328, respectively.

The first pair of electrodes 314 and 315 are the electrodes for the first polarity block, and are separated 330 (FIG. 33) from an electrode support 332 that will be supporting the second pair of electrodes 322 and 324, forming the electrodes for the second polarity block. The first pair of electrodes is separated from the second electrode support 332 by removing material between them. The electrodes 322 and 324 of the second polarity block are separated 334 from the first electrode support 336 that will be supporting the first pair of electrodes 314 and 316, also by removing material between them. Preferably prior to complete separation of the electrodes from each other and from the electrode supports of the other polarity blocks, the electrodes 314 and 316 of the first polarity block are fixed 336 to the second electrode support 332, and the electrodes 322 and 324 of the second polarity block are fixed 338 to the first electrode support 336. The fixing of these elements is preferably done with insulated rods, pins or other preferably rigid connections, described more fully below. Other structures, openings, surfaces, and the like, may be formed 340, as desired, such as for attachment points, locking points, etc. the active surfaces of the electrodes may then the formed 342, such as by electrode discharge machining or other suitable processes. The active electrode surfaces may be formed in a separate finishing process, or may be formed in conjunction with the complete separation of the electrodes relative to each other. As will be described in more detail below, the formation of the active electrode surfaces is preferably done at the same time as the final amount of material is removed to separate the individual electrode surfaces. Final surface finishing 344 is then carried out as necessary.

Creating the electrodes and electrode supports from a single blank of material is particularly efficient and reliable. The above described methods reduce assembly time and effort, and produce multipole device that can take any number of configurations, electrode surface shapes and dimensions. Manufacturability, and precision and accuracy can be improved without a commensurate increase in cost.

Figure 34A:
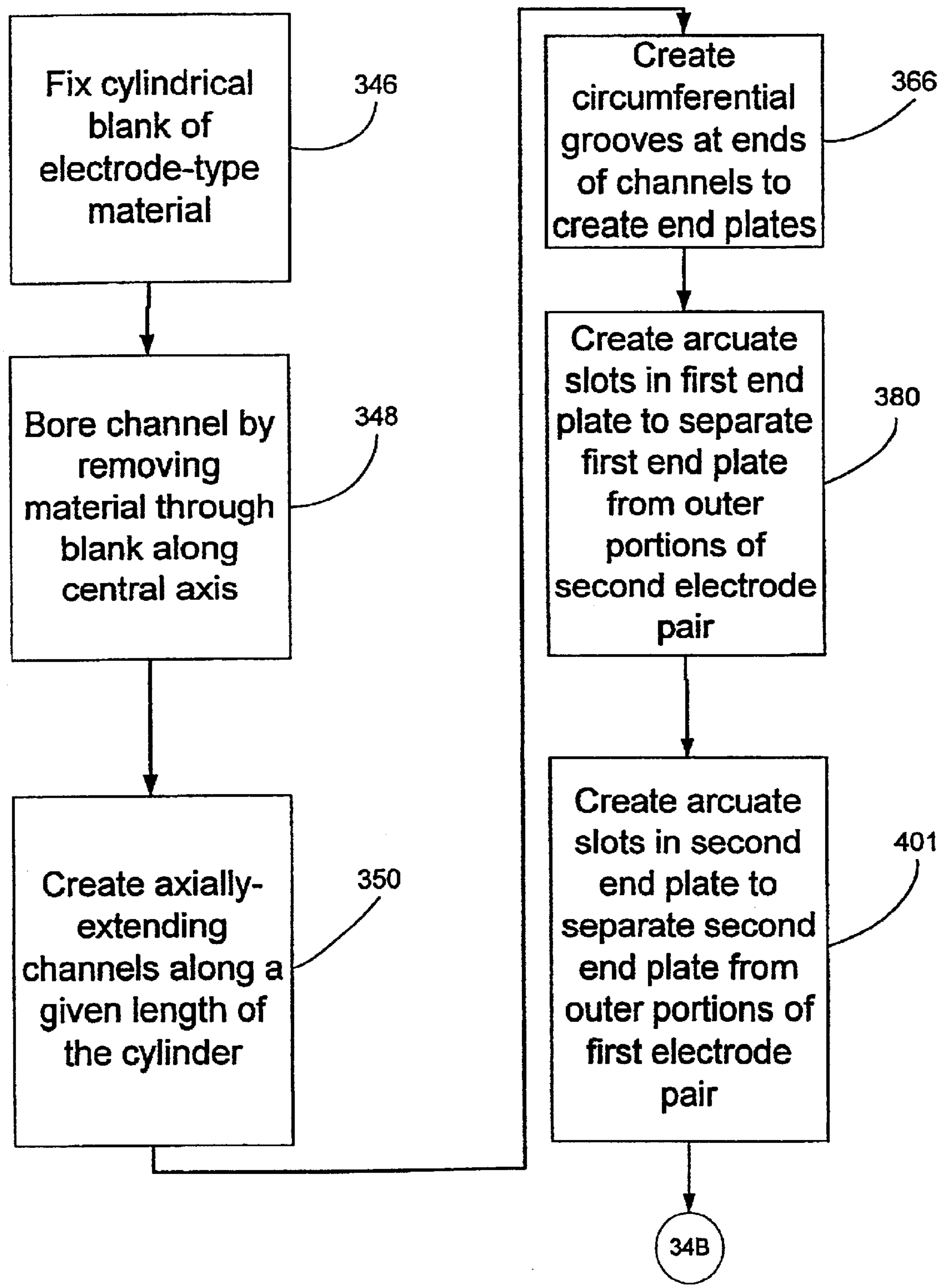
FIG. 34A and FIG. 34B are flow charts depicting steps of a preferred method for producing a multipole device in accordance with another aspect of one of the present inventions.
Figure 37:
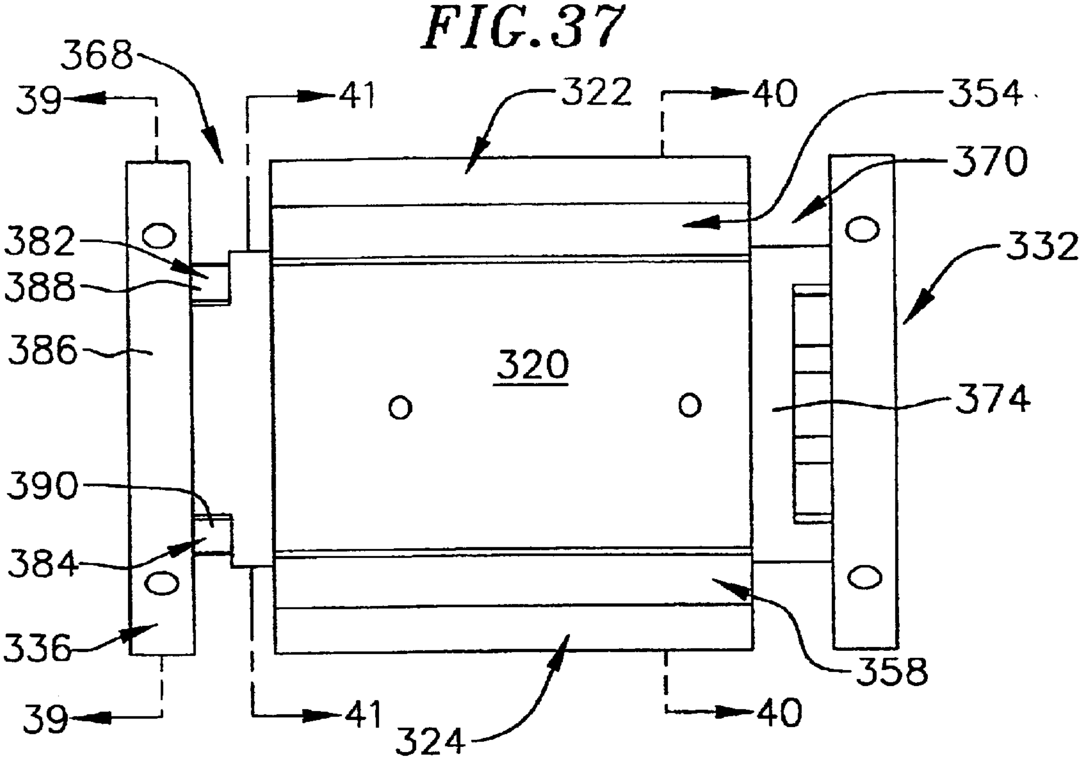
FIG. 37 is a left side elevation view of the multipole device of FIG. 35.

Considering in more detail one preferred method in accordance with one aspect of the present inventions (FIG. 34A and 34B), a cylindrical blank of electrode-type material is fixed 346, for example through conventional means, so that material can be removed from the blank to form the electrodes and the electrode supports. The channel 304 or passage way is bored 348 through the approximate center of the blank so as to be coaxial with center axis 310. The material can be removed through any conventional drilling or machining method suitable for the material and the intended application. Axially extending channels are created 350 along a given length L of a portion of the cylindrical blank. Preferably, the channels are formed by removing material from parts of the outer circumference of the cylindrical blank through conventional machining. Also preferably, there is none channel corresponding to each of the electrodes to be formed in the device. The channels are formed to separate the outer portions of the electrodes from each other. In the embodiment shown in FIG. 35, a first channel 352 separates the first electrode 314 from the lower second electrode 324, a second channel 354 separates the first electrode 316 from the upper second electrode 322, and a third channel 356 separates the first electrode 314 from the upper second electrode 322. A fourth channel 358 (FIG. 37) separates the first electrode 316 from the lower second electrode 324. As best seen in FIG. 35, the third channel 356, as well as each other axially-extending channel, includes a bottom wall 360, a first side wall 362 and second side wall 364 defining what is shown in FIG. 35 as a rectangular-cross-section channel for separating the upper portions of the electrodes. Each channel is preferably deep enough so that later machining of the interior of the blank will completely separate each electrode from the other electrodes over the distance L. For purposes of discussion, the depth of the channel can be the distance that defines the extent in the radial direction of the outer portions of the electrodes.

Circumferential grooves are then created 366 (FIG. 34A) to create the end plates 332 and 336, and to partially separate the end plates from the outer portions of the adjacent electrodes by removing material from the blank. The first groove 368 and the second groove 370 (FIG. 35) preferably extend entirely around the circumference of the blank to a depth slightly greater than the depth of the axial grooves. Each circumferential groove 368 and 370 includes a bottom wall 372 and 374, respectively, an inside wall 376 shown in FIG. 35 for the first groove 352, and an end plate wall 378 shown in FIG. 35 for the second groove 370. The grooves 368 and 370 can be formed in any number of locations axially along the blank, but it is preferred that the end plates 336 and 332 be positioned at the axial ends of the device, for example for ease of manufacture, ease of assembly with other components, and the like. The grooves 368 and 370 are preferably formed sufficiently behind the adjacent end plate so as to provide the end plate with sufficient structural integrity to hold the electrodes it is supporting, to hold the insulating pins, and to provide a sufficient base to allow proper mounting to other components.

Arcuate slots or gaps are created 380 (FIG. 34A) in the first end plate 336. The arcuate gap or opening 382 and 384 in the first end plate 336 separate the first end plate from the outer portions of the second electrode pair, namely the outer portions of electrode 322 and 324. Ultimately, the end plate 336 will be electrically isolated and insulated from the second pair of electrodes 322 and 324. The arcuate gaps 382 and 384 are formed on diametrically opposite sides of the central axis 310 and are formed to generally follow the curvature of the end plate perimeter wall 386. Each arcuate gap includes a radially-inner wall 388 and 390, which will form the radially outer-most wall of that part of each of the second pair electrodes 322 and 324 that extend from the end plate face 392 to the circumferential groove 368. The wall 388 and wall 390 each curve radially inwardly to make room for the walls defining anchor pins holes 394 and 396 for receiving insulated pins to fix the second electrodes 322 and 324 to the first end plate 336. The arcuate gaps 382 and 384, along with the first circumferential groove 368 adequately separate the first end plate 336 from the outer portions of the second pair of the electrodes 322 and 324. Removal of the material to form the circumferential groove and arcuate gaps can be done in any order, and possibly simultaneously, with the ultimate goal being in part to electrically isolate the first end plate 336 from the second pair of electrodes 322 and 324.

Figure 38:
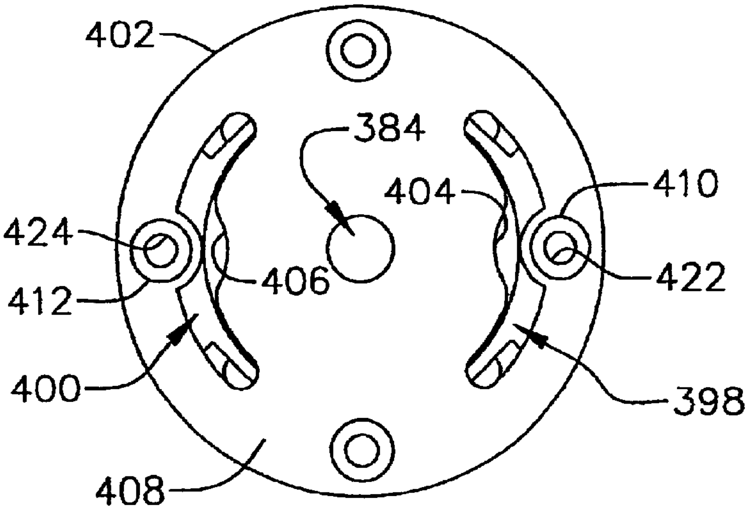
FIG. 38 is a right end elevation view of the multipole device of FIG. 35.
Figure 39:
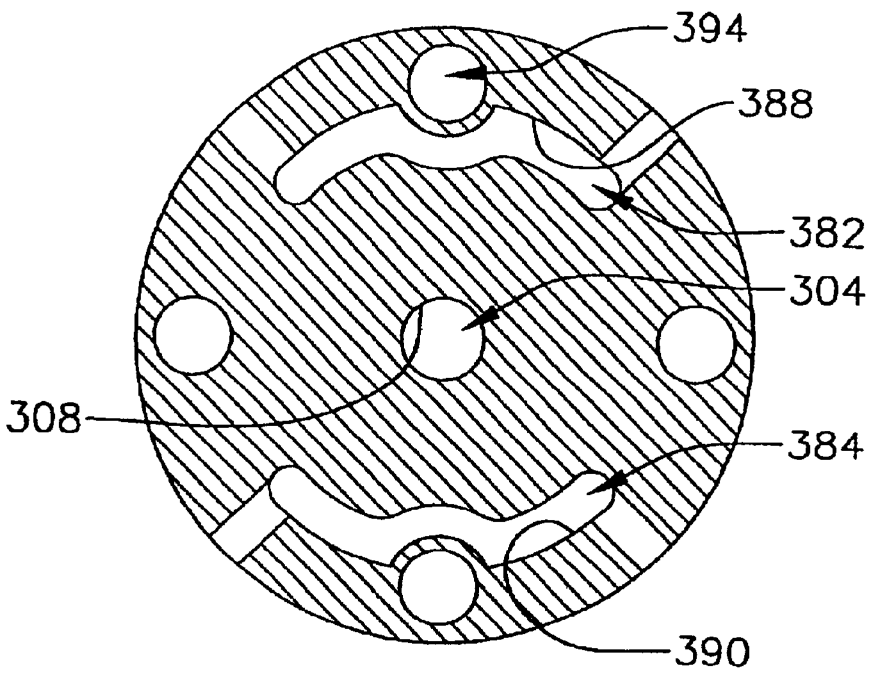
FIG. 39is a transverse section of the multipole device of FIG. 35 taken along line 39—39 in FIG. 36.
Figure 40:
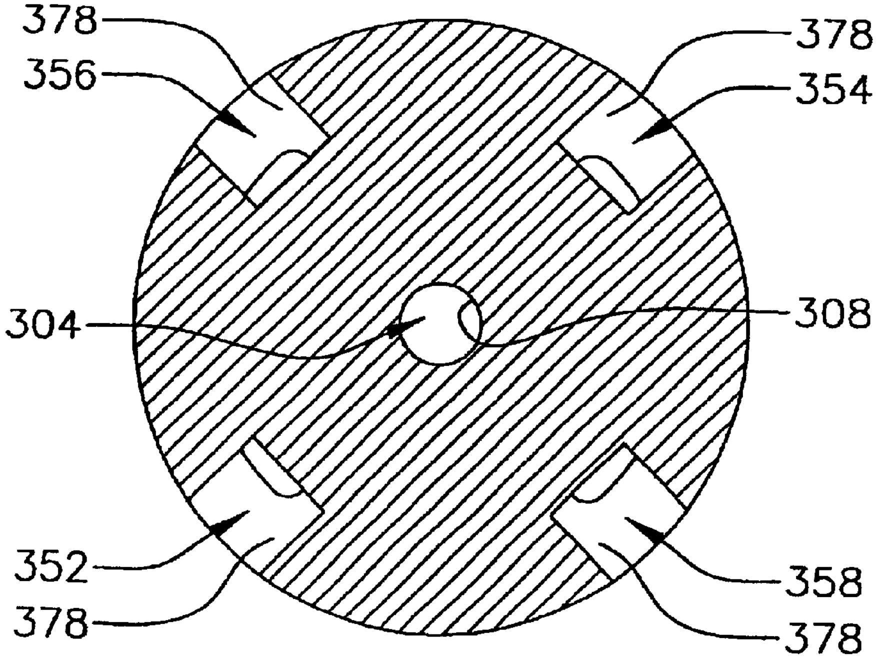
FIG. 40 is a center transverse section of the multipole device of FIG. 35 taken along line 40—40 in FIG. 36.
Figure 41:
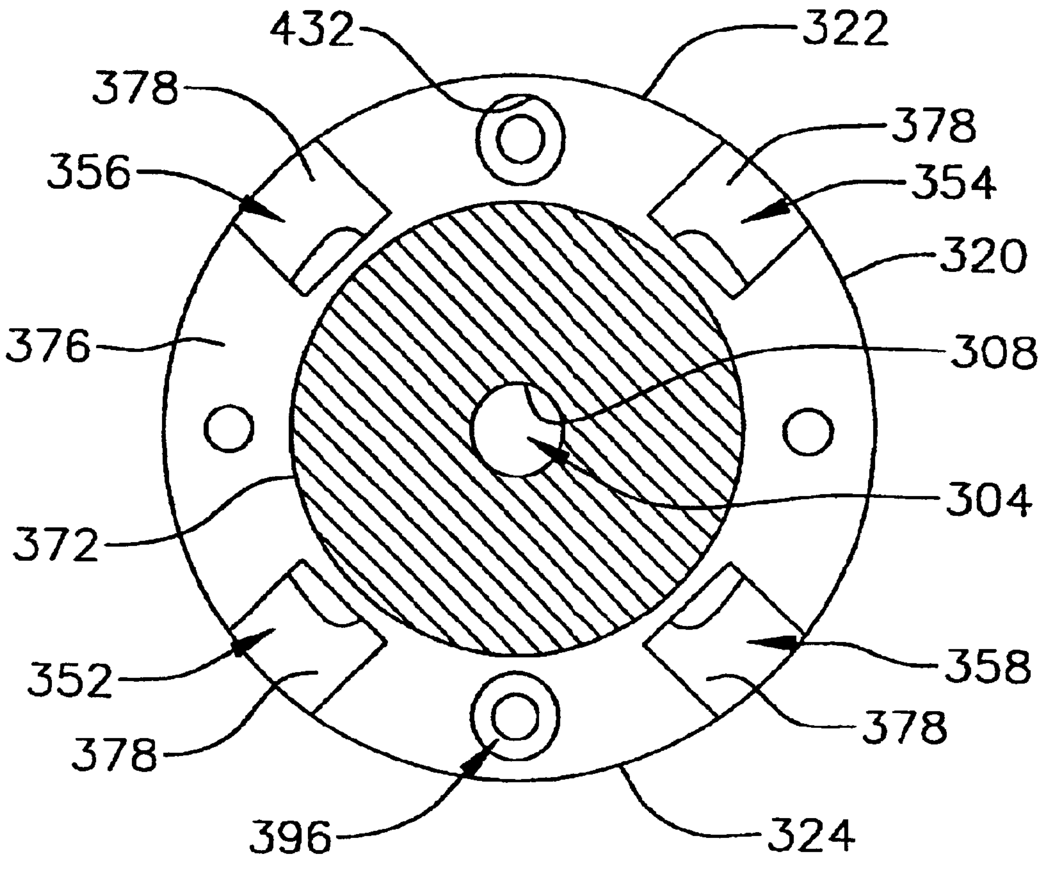
FIG. 41 is a transverse section of the multipole device of FIG. 35 taken along 41—41 in FIG. 36.

Similar steps are carried out at the other end of the device to electrically isolate the second end plate 332 from the first pair of electrodes 314 and 316. Arcuate gaps 398 and 400 (FIGS. 35 and 38) are formed 401 identically in the second end plate 332 as the arcuate gaps 382 and 384 but rotated 90 degrees relative to the first arcuate gaps 382 and 384. Ultimately, the end plate 332 will be electrically isolated and insulated from the first pair of electrodes 314 and 316. The arcuate gaps 398 and 400 are formed on diametrically opposed sides of the central axis 310 and the bore 304 and are formed to generally follow the curvature of the end plate perimeter wall 402. Each arcuate gap includes a radially-inner wall 404 and 406, which will form the radially outer-most wall of that part of each of the first pair electrodes 314 and 316 that extend from the end plate face 408 to the circumferential groove 370. The walls 404 and 406 each curve radially inward to make room for the walls defining anchor pin holes 410 and 412 for receiving insulated pins to fix the first electrodes 314 and 316 to the second end plate 332. The arcuate gaps 398 and 400, along with the second circumferential groove 370, adequately separate the second end plate 332 from the outer portions of the first pair of electrodes 314 and 316. Removal of the material to form the circumferential groove and the arcuate gaps can be done in any order, and possibly simultaneously, with the ultimate goal being in part to electrically isolate the second end plate 332 from the first pair of electrodes 314 and 316.

Figure 42:
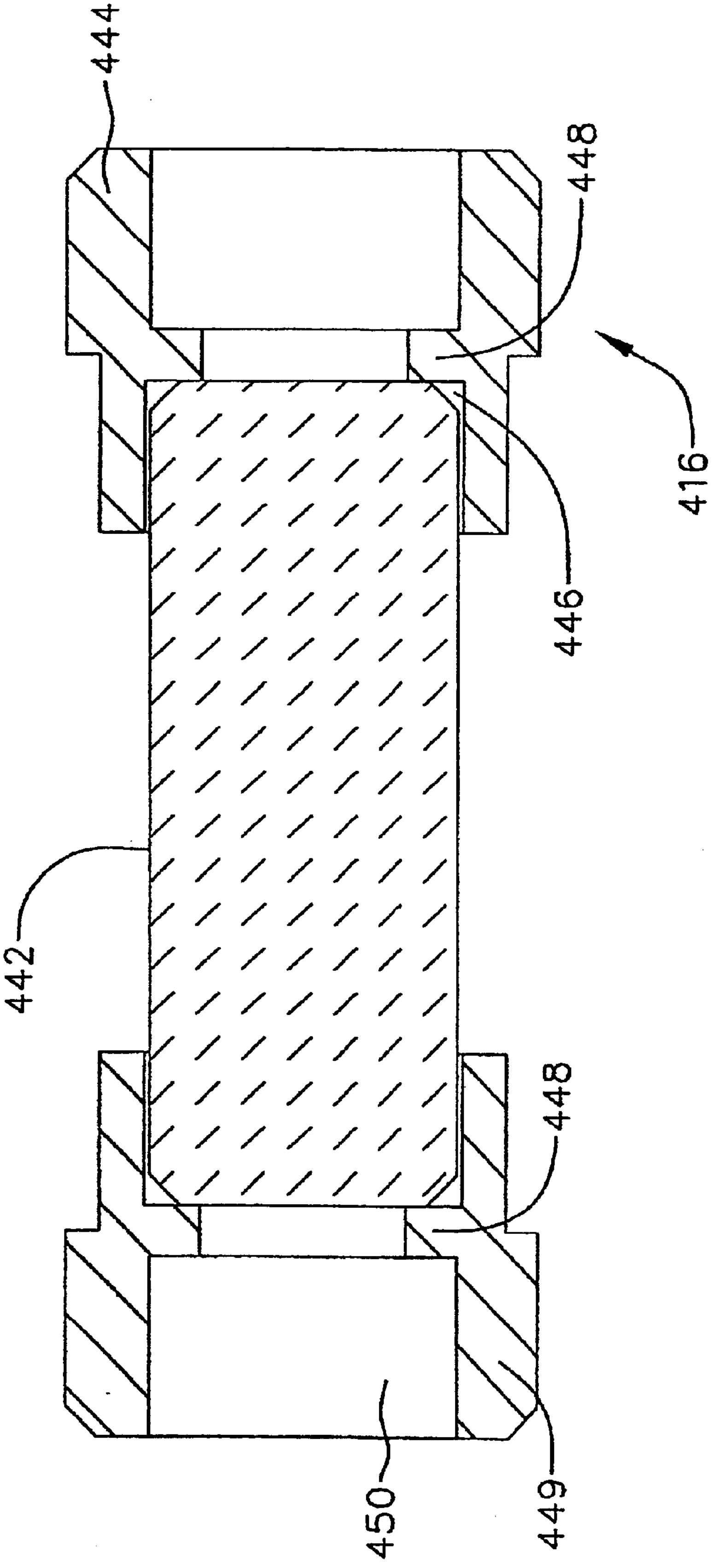
FIG. 42 is a longitudinal cross-section of an anchor pin in accordance with one aspect of one of the present inventions.
Figure 44:
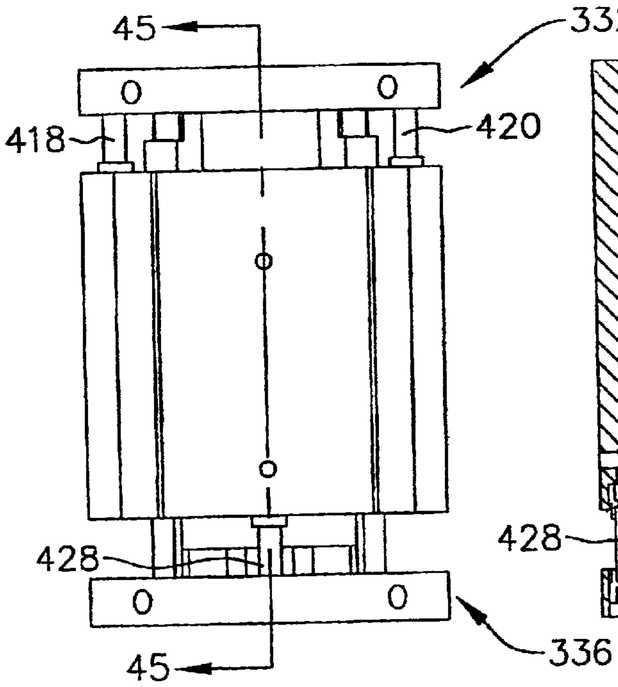
FIG. 44 is a top plan view of the device of FIG. 43.
Figure 45:
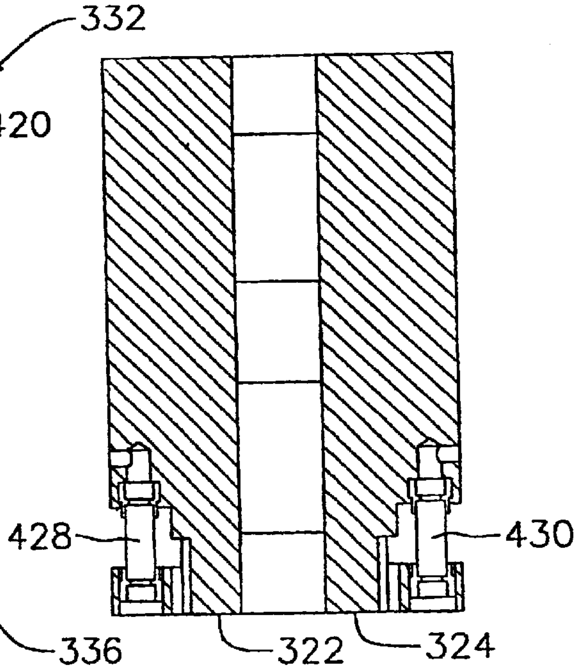
FIG. 45 is a longitudinal cross section of the device of FIG. 43.

Before and after the first pair of electrodes 314 and 316 are electrically separated from the second end plate 322, they are preferably rigidly held in place. They are held in place preferably before separation so that any machining done on the electrode surfaces can be done with precision without concern about movement of the electrodes. They are held in place preferably after separation so that their orientation relative to the other polarity block formed by the second electrode pair and the second end plate 332 are maintained during operation. The second pair of electrodes 322 and 324 are also preferably electrically separated from the first end plate 336 for the same reasons. In one preferred embodiment, locking pieces or insulated anchor pins are fixed 414 (FIG. 34B) between the first polarity electrodes 314 and 316 and the second end plate 332. Insulated anchor pins such as 416 (FIG. 42) can be used to anchor the electrodes to the end plates. Specifically, anchor pins 418 and 420 (FIG. 44) are anchored in their respective openings 410 and 412 and into threaded openings 422 and 424, respectively, formed in the first electrodes 314 and 316. Anchoring can be made easier by the use of access holes such as access hole 426 (FIG. 35).

Insulated anchor pins 428 and 430 are also sued to anchor 431 the second pair of electrodes to the first end plate 336. Specifically, the anchor pins are anchored in respective openings 394 and 396 (FIG. 35) and into threaded openings 432 and 434 formed in the second pair of electrodes 322 and 324, respectively. As with the first pair of electrodes, anchoring can be made easier by the use of access holes, such as access hole 436.

Figure 34B:
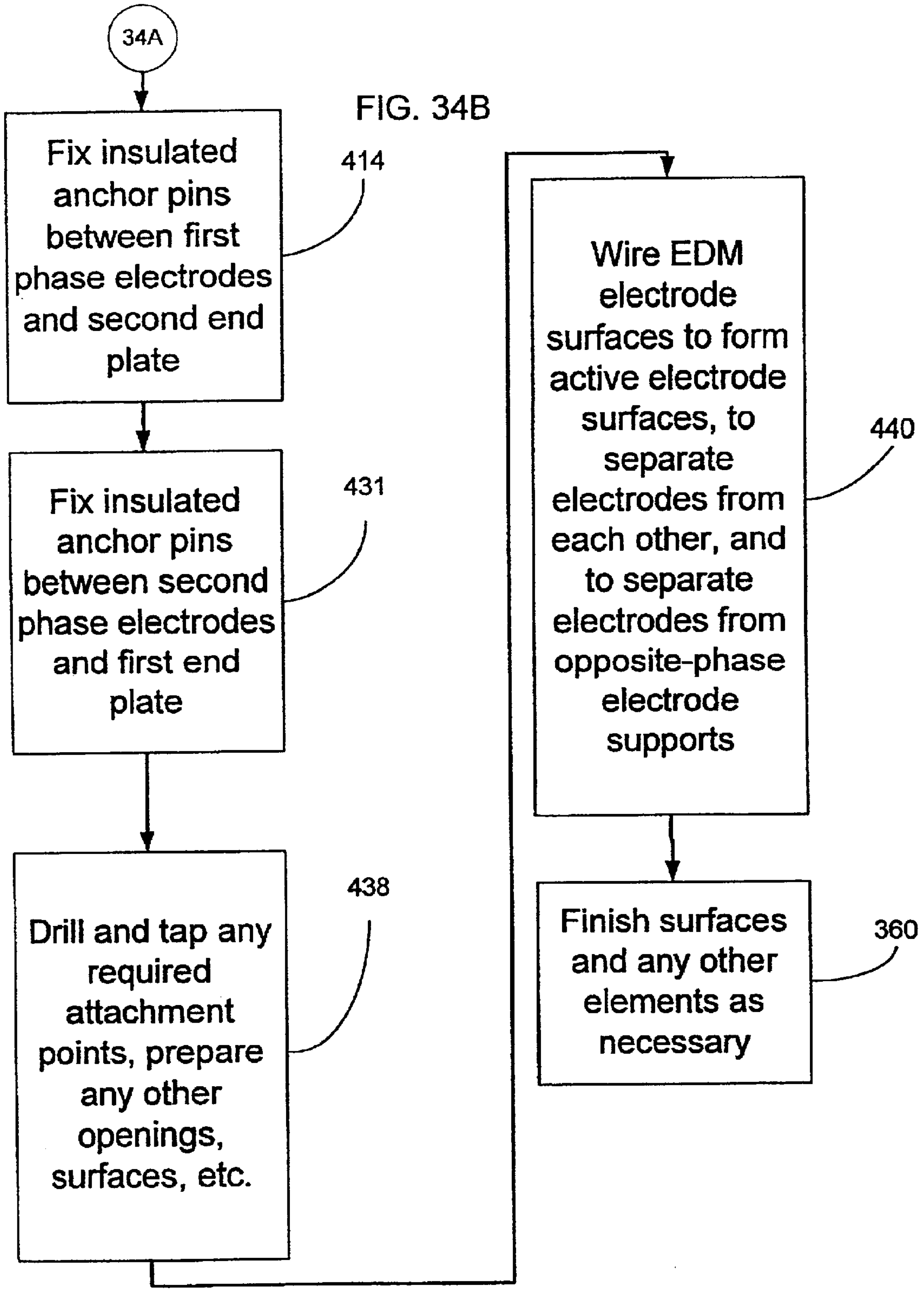
Figure 35:
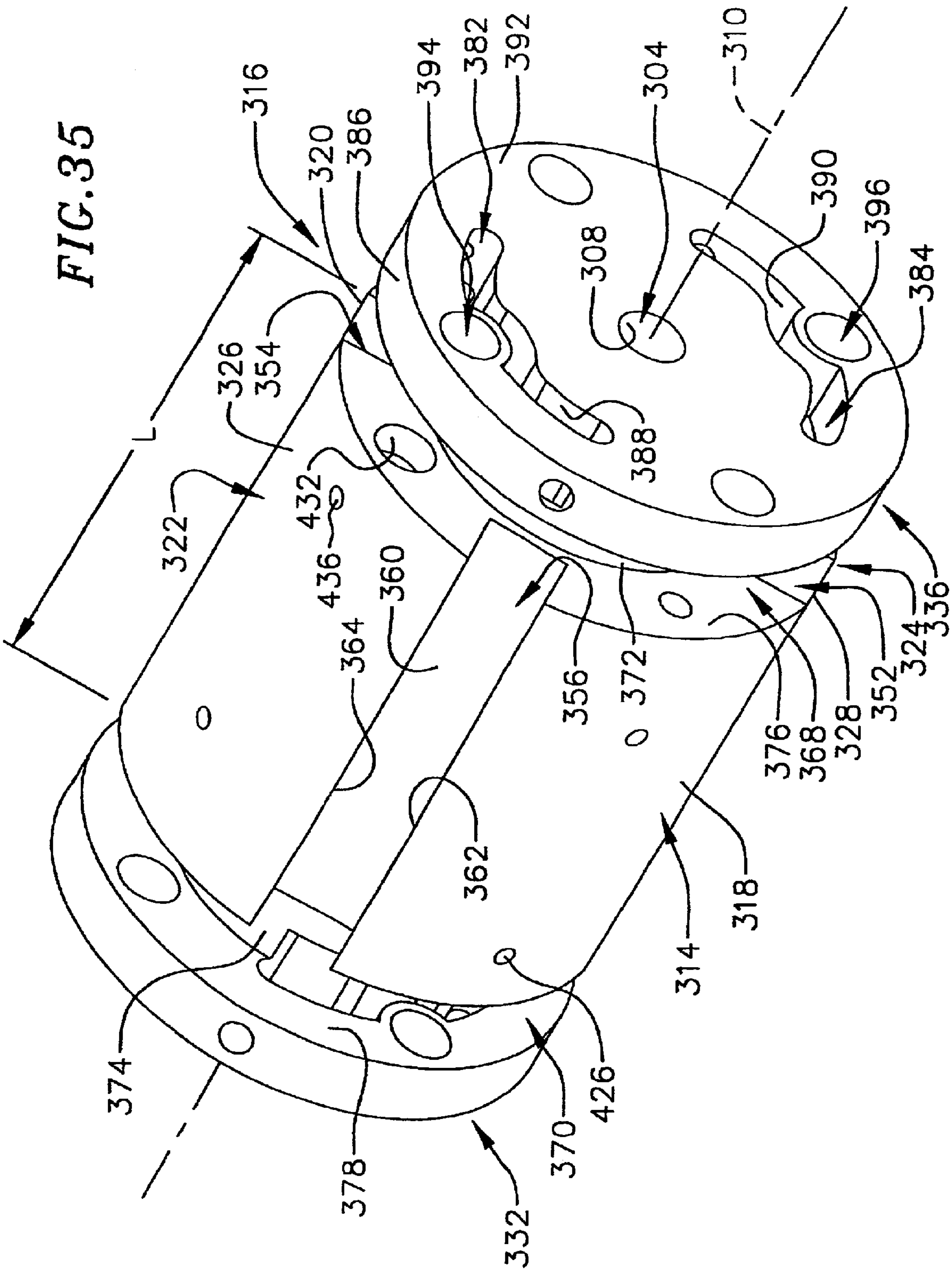
FIG. 35 is an isometric view of a multipole device in accordance with one aspect of thee present inventions.
Figure 36:
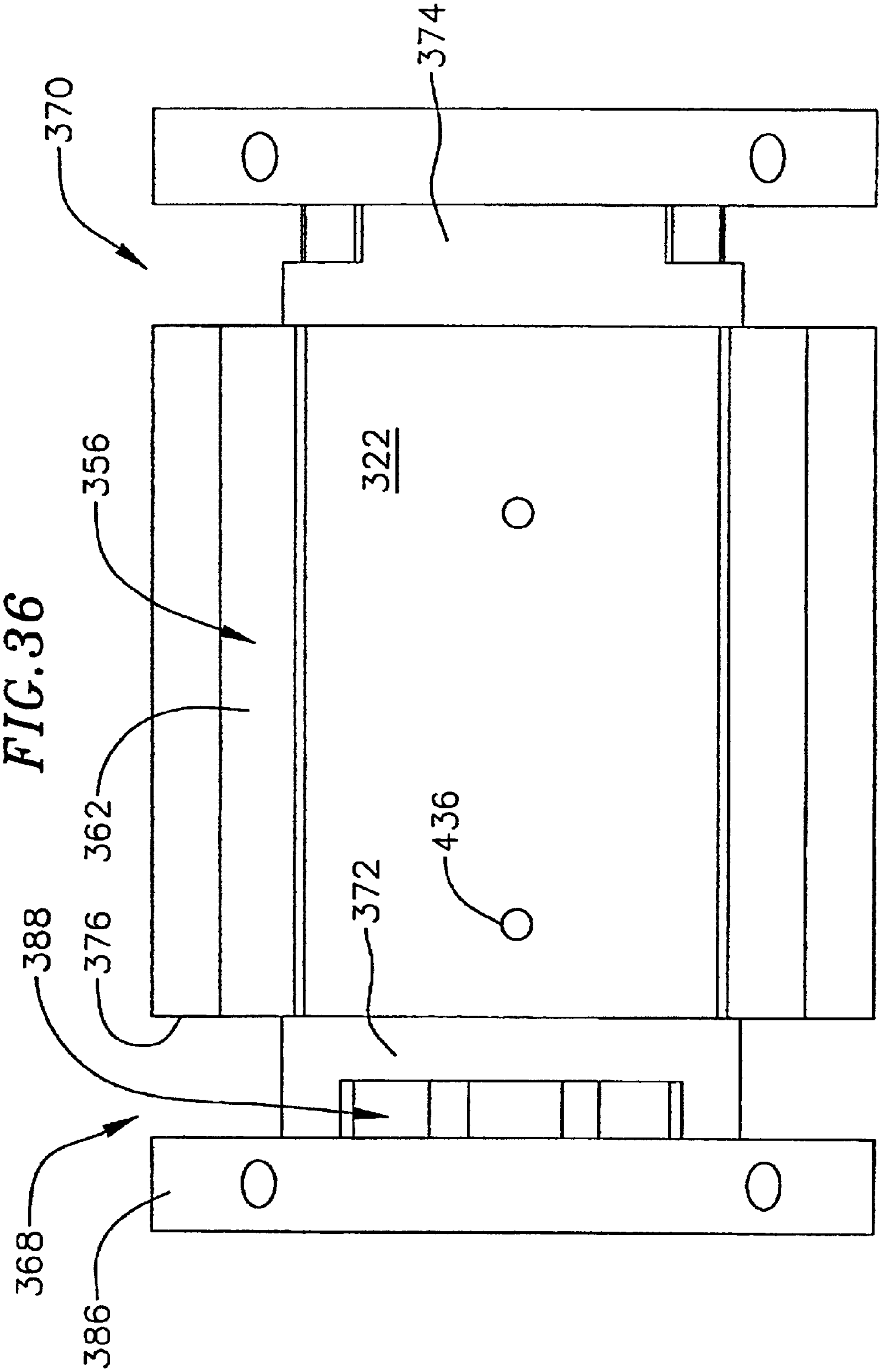
FIG. 36 is a top plan view of the multipole device of FIG. 35.

At any time, but at least after the anchor pins are placed, any other openings, attachment points or surfaces are prepared 438 (FIG. 34B). These openings or surfaces may include attachment points for related components, such as housings, lenses and the like.

Preferably when the anchor pins are in place and the electrodes and end plates are rigidly fixed relative to each other, the interior surfaces of the electrodes are formed 440. In the preferred embodiment, the interior surfaces are formed through EDM. Also preferably, forming the interior or active surfaces of the electrodes also separates the electrodes from each other by removing the remaining material between them. Additionally, electrodes are electrically separated from the opposite-polarity end plates, so that each pair of electrodes is energized only from the end plate integral with the electrode pair. During the process of removal to form the final electrode surfaces, the bottom surfaces 360 of the axial channels 352, 354, 356 and 358 so that each electrode is spaced from and independent of the other electrodes over the length L of the device. The removed material leaves the radial gaps between adjacent electrodes. In the preferred embodiment, the electrodes are formed to have hyperbolic surface according to the basic equation for a hyperbola. Other surface shapes are also useful, and include circular, wedge, flat, concave, as well as other shapes.

Any surfaces or other elements to be finished further are then finished 360 (FIG. 34B) as necessary. For example, the electrode surfaces can be electro-polished or finished in other ways instead of or in addition to EDM.

The end plates are electrode supports for structurally supporting at least one of the electrodes, and preferably all of the electrodes in the polarity block, and they are preferably conductive so that the support can conduct current to at least one electrode and preferably does not extend the full longitudinal length of the polarity block, the conductive support will preferably extend a sufficient distance along the length of the polarity block to adequately support each of the electrodes and to minimize any electrical resistance between the electrodes and any electrical source. To the extent the electrodes are supported tat the ends spaced from the end plates, the structural strength of the end plates as electrode supports is not as important, as if they were literally cantilevered from the end plates.

The junction or transition between the end plates and the respective electrodes they support are preferably formed from the same material as the electrodes and the support end plates themselves, as they will be when they are machined from the same blank. The transitions are preferably seamless between the electrodes and the respective support surface portions adjacent to transitions. It is preferred not have any welds, solder points, joints or other differences in the material between the electrodes and the adjacent support surface. While it is possible that other materials may exist around the transition regions, it is preferred that at least part of the transition regions be formed from the same material, and preferably be seamless, joint-less and continuous. Other material may exist around the transition regions, such as by welding, soldering, material deposition, or otherwise, but it is preferred that there be a sufficient percentage of continuous or seamless transition to reliably support the electrode and the conductive support. Preferably, there is sufficient transition region to support the electrodes over the lifetime of the product, but a smaller transition region can be used for preliminary processing of the polarity block until such time as the transition region can be strengthened by other means, for example addition of more material or application of other supports.

Figure 43:
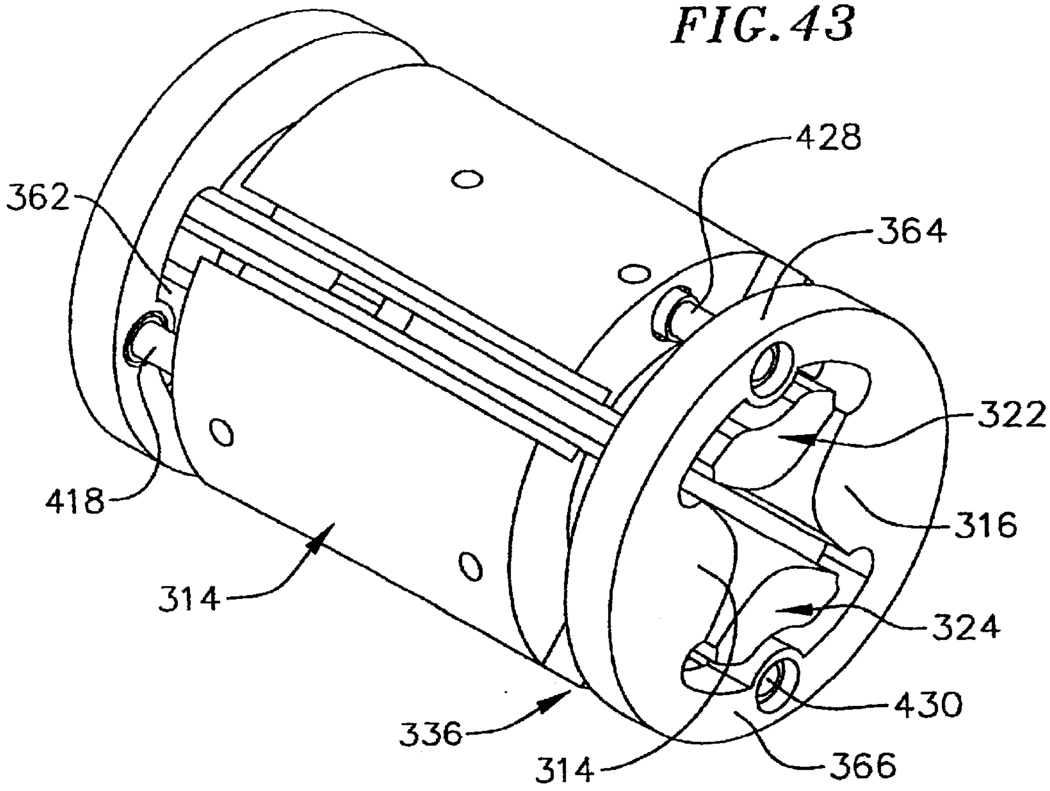
FIG. 43 is an isometric view of a complete multipole device in accordance with one aspect of the present inventions.

The first pair of electrodes 314 and 316 can be seen in the multipole device shown in FIG. 43. The electrodes are integral with and are cantilevered from the end plate 336, which formes an electrode support. The end plate 336 not only provides reliable structural support for the first pair electrodes but also serves as a conductor from an energy supply (not shown) to energize both of the electrodes, even with a single connection to the energy supply. Because the electrodes and their support were formed from the same monolithic blank of material, there is no seam, weld or other joint in this configuration to interfere with conduction between the end plate and the electrodes. Additionally, the electrode surfaces are preferably formed after the electrodes and the end plates are fixed, the configuration and dimensions of electrode surfaces can be precisely and accurately established.

The first pair of electrodes extend preferably the entire length of the device and include reduced end portions such as end portion 362, extending into an opening in the second end plate, which will be better understood after considering the preferably identical structures in the second pair of electrodes. Generally, in one preferred embodiment, one set of the electrodes and their corresponding end plates are preferably complementary to and substantially mirror images of the other electrodes and corresponding end plate. In the embodiment shown in FIG. 43, the opposite ends of the second pair of electrodes are integral with and supported by the second end plate 332 in the same manner as was described above with respect to the first pair of electrodes and the first end plate.

The ends of the second pair of electrodes opposite the second end plate 332 are reduced in size and extend underneath the curved ring portions 364 and 366, and between the curved ring portions 364 and 366 and the adjacent first pair of electrodes 314 and 316 on the first end plate 336. The reduced ends of the second pair of electrodes and the openings they fit into are formed by the removal of material to form the arcuate gap 382 and 384 and to shape the electrodes. The relative orientation and configuration of how the reduced ends of the second pair of electrodes fit in the opening within the surrounding ring defined by the end plate is determined by the amount and location of the material being removed. As noted above, the placing of the reduced ends of the electrodes within the end plate is accomplished in two steps in this embodiment, namely the creation of the arcuate gaps 382 and 384, and the removal of material to form the rest of the electrodes. However, they can be accomplished in one step or more than two steps.

Each anchor rod is preferably formed from a ceramic or other insulating pin 442 sandwiched between stainless-steel or other suitable end caps 444. The end caps preferably include circular or other recesses 446 for covering respective ends of the pin 442. An internal annular stop wall 448 properly positions each end cap on the end of the pin 442. On the opposite side of the annular stop wall, each end cap includes a bore 450 having an inside diameter slightly smaller than the inside diameter of the recess 446. The outside diameter of the body is larger than the outside diameter of the portion covering the pins 442. The anchor rod 416 can be welded, bonded, brazed or otherwise fixed in the anchor pin openings. Other configurations of anchor pins can also be used. The insulating pin can be formed from ceramic, glass, alumina or similar materials. The end caps can be formed from 316 stainless-steel, titanium, molybdenum or similar materials.

The electrodes and end plates or support elements for a given polarity block are preferably formed from the same material and are integral with each other. In the preferred embodiment, they are formed from a monolithic blank of material, such as by machining. The electrodes are preferably cantilevered from the respective end plate or ring support, and are rigidly fixed through insulated pins or other supports to the end plate of the other polarity block.

The ring supports are shown in one preferred embodiment as end plates at respective ends of the device. The ring supports can be positioned at any point along the axial length of the device, as long as the respective ring supports do not interfere electrically with each other. The ring portions of the supports are preferably spaced a significant distance radially from the center axis 310 to minimize any field effects on ions passing between the electrodes. The axial thickness and the radial thickness of the ring supports can be any practical dimension. The sizes of the arcuate gaps are such as to minimize any field effects on ions while leaving sufficient material to adequately support anchor pins and to reliably mount and support the device.

The device can have a wide range of dimensions, from half a centimeter or less to a foot and more. Dimensions may be limited by limitations on manufacturing technology. The diameter of the device may be determined by the characteristics of the anchor pins, such as their strength and permissible sizes for the material selected.

The methods allow for the steps to be carried out in any number of sequences and produce multipole devices having any number of configurations. The electrodes can have a wide range o sizes and shapes, as can the electrode supports. The polarity blocks are preferably machined from a single monolithic blank, but they can be formed from more than one piece of material. In the preferred embodiment, at least one electrode and its support are formed from the same blank of material. Material can be removed from any number of parts of an electrode or the blank material, depending on the configuration of the original polarity block and its raw form, and the amount and location of the material to be removed will also be a function of the desired final form of the electrodes.

The electrode supports can be formed so that they are positioned at any number of locations on the device. The embodiments described have the end plates at the extreme ends of the device. However, the electrode supports can be positioned axially at any number of locations along the device, and at any number of locations spaced from the central axis 310. In the preferred embodiment, electrode supports are positioned sufficiently far from the central axis 310 to minimize any field effects on the ions. Preferably, the electrode supports are positioned radially outward from their electrodes.

Having anchor pins oriented axially allows the device to expand and contract radially with minimal influence from any differences in the coefficients of thermal expansion of the anchor pins. The anchor pins can be oriented in any number of directions and can be included with any number of dimensions. However, axial orientation of the anchor pins is preferred. As an alternative, the anchor pins can extend radially from the perimeter wall 386 (FIG. 35) to the underlying second electrodes 322 and 324, for example. However, any effects on the accuracy of the device due to differences in thermal expansion of the anchor pins may have a greater effect because different expansion and contraction during normal operation may change the relative spacing or orientation of the electrodes.

Other types of possible machining may be used instead of or in addition to EDM. For example, plunge EDM, electrochemical machining or other processes may be used. EDM is preferred, however, for precision requirements. Additionally, the type or mode of process being used may depend on the final application, the precision required for the device as well as other considerations. For example, higher precision devices may justify more rigorous methods of manufacture. For example, to ensure adequate stress relief an X may be cut to connect diagonally opposite ends of the arcuate gaps. Other techniques may be used as well. However, one presently preferred sequence is to machine the grooves and apply stress relief techniques. The arcuate gaps are then machined in the end plates such as by conventional machining or EDM. Stress relief is then applied again. The anchor pins are then installed by any suitable method, followed by creation of the electrodes by removing material. In the case of EDM, an X is formed followed by detailed machining of the precise electrode surfaces.

The anchor pins can be mounted or fixed in any number of ways. The form of mounting may be dictated by the type of material being used, as well as the applications. In some devices, epoxy or brazing and welding may be acceptable.

In several aspects of the present inventions, precision alignment of parts is made easier. For example, like-polarity multipole elements may be formed, for example, extruded, cast, molded, machined or otherwise produced, at the same time and in the same process. In one aspect, both polarities could be taken from the same extrusion and processed essentially identically so that they are complementary to each other. Consequently, rod alignment for a given polarity block is built into the assembly. The need for precision fixtures to create the assembly is reduced or eliminated entirely. Likewise, because like-polarity multipole elements are all preferably part of the same block, for example the same metallic extrusion, making individual electrical connections to each electrode can be avoided. In one preferred embodiment, a single simple connection can be used for each polarity, and can be applied to a surface significantly larger than the electrodes themselves. Additionally, the electrical connection need not be the mechanical support, and the resistance of the connections is predictable and any variation from one to the next is negligible. The connections are more difficult to break, which also enhances the overall assembly robustness. Moreover, there are fewer elements in the design to serve as potential charging sites. For example, any insulators that my be included may be as few as three small rods, which may be hidden behind the electrodes, for fixing the two polarity blocks relative to each other. Where a sleeve is used to fix the two polarity blocks, the sleeve may be placed radially outward from the outer support material.

Tapering the ends of electrodes is also easier where a number of the electrodes are held by the same support. Tapering commonly held electrodes makes it easier to ensure that the taper on the electrodes is concentric with the lens element taper, for example.

Assembly of the elements to form the multipole component is relatively easy. The entire assembly can be built with fewer parts, and the assembly process is simpler. The need for precision alignment, and tedious soldering or welding is significantly reduced or eliminated entirely. The time used to build the component is significantly reduced, which may thereby reduce the cost of the component.

Design of multipole components is also made easier. Axial gas conductance can be more easily altered by adjusting the amount or longitudinal extent of exterior or outer material removed from the extrusion, such as from the electrodes. By doing so, it is easier to provide for appropriate vacuum pressures for instrument optimization, and smaller pumps may also be possible. Additionally, radial gas conductance can be more easily altered by adjusting the depth of the cut into the block, and therefore the radial depth of the electrodes. The depth of the cut will expose a radially shorter or longer cross-sectional gap between the electrodes. The cross-sectional gap can be made constant with radius or it can change in the radial direction, such as to increase in width further away from the central axis.

Designs can be easily scalable to different lengths, such as by using longer or shorter lengths, such as extrusion lengths, different diameters, and different dimensions in the gaps between electrodes. It is also easier to integrate vacuum partitions, tailor pressure drops within a system and have greater control over gas conductance. The remaining support material can be used as the vacuum partition with a radially-extending seal to the vacuum chamber walls (see, for example, FIG. 2). Consequently, it is not necessary to pass the device through a vacuum partition. For example, two support sections can be left intact, one for each polarity, and the device can be used in three vacuum stages, for example.

Electrodes can also be designed so that the assembled component has a very small Ro, even with small electrodes. Small Ro dimensions allow appropriate matching to like-dimensioned components so that the ions are not subjected to multiple expansion and reduction in the size of the aperture through which the ions pass. By making the electrodes other than right circular cylindrical, longitudinal strength can be incorporated into the design while still allowing a relatively small active electrode surface. Longitudinal strength can be provided by additional material at the radially outward-most portion of the electrode. A wedge-shaped electrode, for example, can provide the desired structure, and makes smaller electrodes stronger than comparable round electrodes. These alternative shapes can result in significant aspect ratios for the electrodes, allowing significant improvements in the electrical characteristics produced in the electrode without sacrificing strength or structural integrity. Other shapes are possible as well. In another example, the removal of support material from the ends to the support surfaces may leave tapered finger of support material along the outer edge of each of the electrodes. For example, the support surface may include a cylindrical ring or bank having an outer wall of any desired length l, and the outer diameter of the transition region material may taper in the axial direction toward one or both ends. The outer diameter of the transition region may range from a value equal to the outer diameter of the support surface to the outer diameter of the electrodes. The taper may end at the ends of the electrodes, or before the ends. If the taper ends before, the outer diameters of the electrodes may then be constant from the end of the taper to the ends of the electrodes.

Multipole components according to one aspect of the present inventions can have any number of lengths, anywhere from several millimeters, for example 4–5 mm or less, to 12 or 18 inches or more, such as may be used to pass through several vacuum walls. A doublet could be made relatively small, and such small multipole components could readily be used for beam cooling and entrance optics. Outer diameters can also range in size from small to large. Outer diameters can be larger than previously possible to add strength, but with small electrodes and smaller radius, the outside diameter can be on the order of 10 mm or less. The outside diameter could be as large as four inches or more. The fabrication process such as extrusion, electrode discharge machining or other processes may place constraints on the size of the component, and may limit the length to diameter ratio, but larger diameters ar now possible with the present methods and apparatus. The inside diameters between the electrodes could be as small as 1 mm or less, and hyperbolic configurations are easily produced, and having a 40 degree included angle. For example, it may be possible to produce a multipole device as small as a 2Ro of 1 mm or less, and having a hyperbolic surface and a triangular-shaped electrode with a forty degree included angle. Such smaller electrodes may benefit from final finishing of the electrode surfaces, such as by EDM, as well.

Design and manufacture of electrodes is also made easier. For example, design and manufacture of non-cylindrical rod faces is easier and practical. Hyperbolic and wedge-shaped electrodes are easier to design and manufacture, and smaller-sized electrodes are also more practical. Other electrode configurations are easily and manufactured as well.

In another aspect of the present inventions, like-polarity multipole elements may be formed, for example extruded and/or machined, at the same time and in the same process, and preferably both polarities would be taken from the same blank. Electrode alignment is built into the assembly, and the need for precision fixtures to create the assembly is reduced or eliminated entirely in this approach as well. Likewise, because like-polarity multipole elements are all preferably part of the same block, making individual electrical connections to each electrode can be avoided. A single simple connection can be used for each polarity, and can be applied to a surface significantly larger than the electrodes themselves. The connections are more difficult to break, which also enhances the overall assembly robustness. Designs can easily be scalable to different lengths, such as by using longer or shorter lengths, different diameters, and different dimensions in the gaps between electrodes.

In accordance with a further aspect of one of the present inventions, one or more of the polarity blocks can be formed by a molding, casting or other pre-form process. Any configuration of a polarity block or assembly of polarity blocks can be made by such processes, and the particular process that would be used may be selected as a function of the desired cost, the desired precision as well as other criteria. Polarity blocks or parts thereof can be formed by these processes to have any number of configurations, including configurations such as the polarity blocks described herein as well as other configurations. Moveover, precursor blanks of the final polarity blocks can also be formed by these processes as desired, and the degree to which a finished product is achieved may depend on the form of the mold, casting or other pre-form structure used to produce the polarity block or its components.

In one preferred aspect of one of the present inventions, a mold such as mold 454 (FIG. 46) may take any number of configurations which would be apparent to those skilled in the art of molding metal and other electrically conductive structures, and may include a first mold body 456 to be joined with a second mold body 458 to form a preferably fully enclosed cavity 460 after the two or more mold body elements are joined together. The sections of the mold body elements shown in FIG. 46 preferably include a mirror-image portion to form the complete mold with the other half of the cavity identical to that shown in FIG. 46. The first mold body 456 and the second mold body 458 joined along a transverse plane to form the cavity 460.

Figure 46:
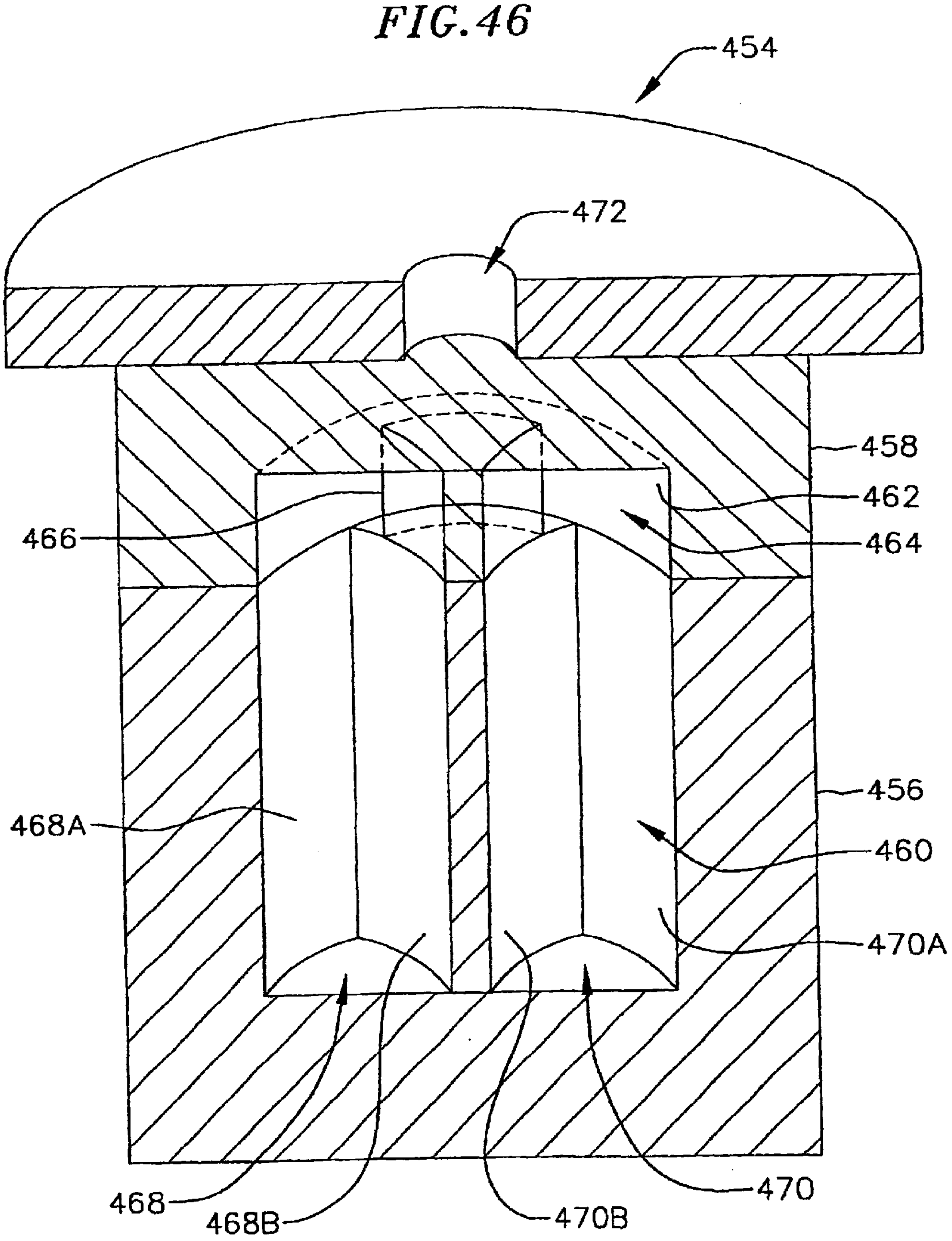
FIG. 46 is a schematic and longitudinal cross section of one embodiment of a mold assembly for producing an electrode and support combination in accordance with another aspect of one of the present inventions.

In the embodiment shown in FIG. 46, the mold 454 would be used to produce a single polarity block, such as the polarity block 240 shown in FIG. 26, and the elements of the mold defining the cavity 460 will be described in the context of the intended production of a polarity block such as a block 240 shown in FIG. 26. Nonetheless, it will be apparent to those skilled in the art that other configurations of polarity blocks can be made by similar processes, and precursor elements having other configurations can also be made by similar processes. Additionally, precursor's of complete assemblies of polarity blocks such as 240 and 240A can also be made by pre-form processes, typically followed by additional processing such as removal of material, finishing and the like.

In a preferred embodiment, the cavity 460 is defined and formed so as to produce a support and at least one electrode. In the configuration shown in FIG. 46, the cavity will produce two electrodes supported by a ring-shaped electrode support. Specifically, the cavity preferably includes a first wall 462 defining an annular groove 464 to form the ring-shaped electrode support, such as support 242 in FIG. 26. An internal wall of the ring-shaped electrode support is formed by a convex internal wall 466 extending through an arc. The dimensions of the groove 464 will determine the substantial dimensions of the support 242. Preferably, the groove extends around in a complete circle within the second mold body 458. The radial thickness of the support 242 is determined by the spacing between the wall 464 and wall 466.

The cavity 460 also preferably includes a first electrode cavity 468 and a second electrode cavity 470 for defining the and forming the first and second electrodes 254 and 256 supported by the support 242. The electrode cavities open into the annular groove 464, which defines the electrode support 242, so that when the polarity block is formed in the mold, at least one and preferably both of the electrodes are formed to be monolithic with the electrode support. The cavity is formed so that the electrodes and therefore the electrode cavities forming them extend inwardly toward the interior of the cavity from the annulus defined by the groove 464. In the preferred embodiment, the wall 462 has a diameter equal to or greater than the diameters of the outer walls 468A and 470A of the electrode cavities.

Each of the electrode cavities also includes inner walls 468B and 470B extending inwardly and preferably to the center of the cavity 460 to keep the two electrodes of the polarity block separate. As shown in FIG. 46, the walls extend from the back of the cavity 460 as the cavity is depicted in FIG. 46 to the opposite side of the cavity so that the two electrodes formed in the mold are connected only through the ring-shaped support formed in the mold. The material and the structure between the walls 468B and 470B separate the first and second electrode cavities so that the molded electrodes are spaced apart.

Once the mold is prepared as desired, a precursor polarity block can be formed by filling the cavity through one or more fill ports 472 opening into the cavities as necessary. The fill port 472 is shown in FIG. 46 in an outside surface of the second mold body 458 but without any connecting channels into the cavity 460 for simplicity. It should be understood, however, that any desired fill channels can be provided as would be known to those skilled in the relevant part. Suitable coatings or other preliminary preparation for the mold can also be carried out as desired. The mold is then filled with a material that will be suitably conductive once set and removed from the mold, and the setting process can be carried out in any number of ways, such as by cooling, pressurization followed by cooling, hot isostatic pressurization, or other desired techniques. Once the polarity block is removed from the mold, the surfaces can be further machined, finished or otherwise processed to achieve the desired configuration for the polarity block. For example, material can be removed from the electrode surfaces to provide an active electrode surface. Material can be removed in any number of ways, including conventional machining, electron discharge machining, and other processes.

A mold can also be used to prepare a material blank that can be used to produce an assembly of polarity blanks. For example, a mold or other forming technique can be used to produce a blank of material having the outside configuration of the assembly shown in FIG. 27 before the electrodes are separated from each other and from the opposite support rings. Once the blank is molded, a bore can be formed along the central axis and the electrodes separated from each other as previously described. Electrodes of one polarity block can then be separated from the support of the opposite polarity block, and conversely the electrodes of the opposite polarity block can be separated from the support of the first polarity block. The assembly can then be further processed as desired.

Having thus described several exemplary implementations of the invention, it will be apparent that various alterations and modifications can be made without departed from the inventions or the concepts discussed herein. Such operations and modifications, though not expressly described above, are nonetheless intended and implied to be within the spirit and scope of the inventions. Accordingly, the foregoing description is intended to be illustrative only.

We claim:

1. A device for manipulating ions, said device comprising:

(a) a holder of electrically conductive material having an aperture, said aperture having a central longitudinal axis;

(b) a first electrode extending parallel to said longitudinal axis, said first electrode having a first end fixed and integral with said holder and a second end spaced from said first end holder;

(c) a second electrode extending parallel to said longitudinal axis and spaced from said first electrode and said holder, said second electrode having a first end adjacent the second end of said first electrode, said second electrode having a second end adjacent the first end of said first electrode; and (d) a rigid support of electrically insulated material having a first end fixed to said holder, said rigid support having a second end fixed to the second end of said second electrode.

2. A device for manipulating ions, said device having a longitudinal axis and comprising:

(a) a first holder of electrically conductive material;

(b) a second holder of electrically conductive material spaced from said first holder;

(c) a first electrode extending parallel to said longitudinal axis, said first electrode having a first end fixed and integral with said first holder, said first electrode having a second end adjacent said second holder and, spaced from said first end and second holders;

(d) a second electrode extending parallel to said longitudinal axis, said second electrode having a first end fixed to said second holder and a second end adjacent said first holder and spaced from said first and second holders;

(e) a first rigid support of electrically insulated material having a first end fixed to said first holder, said first rigid support having a second end fixed to the second end of said second electrode; and (f) a second rigid support of electrically insulated material having a first end fixed to said second holder, said second rigid support having a second end fixed to the second end of said first electrode.

3. A device as recited in claim 2, further comprising:

(a) a third electrode extending parallel to said longitudinal axis and spaced from each of said first and second electrodes, said third electrode having a first end fixed and integral with said first holder, said third electrode having a second end adjacent said second holder and spaced from said first and second holders;

(b) a fourth electrode extending parallel to said longitudinal axis and spaced from each of said first, second, and third electrodes, said fourth electrode having a first end fixed and integral with said second holder, said third electrode having a second end adjacent said first holder and spaced from said first and second holders;

(c) a third rigid support of electrically insulated material having a first end fixed to said first holder, said third rigid support having a second end fixed to the second end of said fourth electrode; and (d) a fourth rigid support of electrically insulated material having a first end fixed and integral with said second holder, said third rigid support having a second end fixed to the second end of said third electrode.

4. A device as recited in claim 3, wherein said first, second, third, and fourth electrodes are located at 90° intervals about said longitudinal axis.

5. A device as recited in claim 3, wherein each of said first and second holders has an aperture that extends along said longitudinal axis.

6. A device as recited in claim 5, wherein each of said apertures is circular and concentric with said longitudinal axis.

7. A method of producing a device for manipulating ions comprising the steps of:

(a) forming a polarity member of electrically conductive material comprising:

(1 ) a holder having an aperture with a central longitudinal axis; and (2) a first electrode fixed and integral with said holder and extending parallel to said longitudinal axis;

(b) fixing a first end of a rigid support of electrically insulated material to said holder; and (c) fixing a second electrode to said holder a second end of said rigid, support so that said second electrode is spaced from said holder and mid first electrode and extends parallel to said longitudinal axis.

8. The method as recited in claim 7, wherein said polarity member is machined from a block of electrically conducted material.

9. The method as recited in claim 7, wherein said rigid support is a first rigid support, said polarity member is a first polarity member, said holder is a first holder having a first aperture and said second electrode is part of a second polarity member of electrically conductive material comprising a second holder fixed and integral with said second electrode and having a second aperture axially aligned with said first aperture, said method further comprising the steps of:

(a) fixing a second rigid support of electrically insulated material to said second holder; and (b) fixing said first electrode to said second rigid support so that said first electrode is spaced from said second holder.

10. The method as recited in claim 9, wherein said second electrode is formed integrally with said second holder from the same material.

11. The method as recited in claims 9, wherein said first polarity member and said second polarity member is formed by machining from a single block of electrically conducted material.

12. The method as recited in claim 9, wherein said first polarity member has a third electrode fixed and integral with said first holder and said second polarity member has a fourth electrode fixed to said second holder, each of said third and fourth electrodes extending parallel to said longitudinal axis and spaced from said first and second electrodes, said method comprising the steps of:

(a) fixing a third rigid support of electrically insulated material to said first holder;

(b) fixing said third electrode to said third rigid support so that said third electrode is spaced from said second holder;

(c) fixing a fourth rigid support of electrically insulated material to said fourth electrode; and (d) fixing said fourth electrode to said fourth rigid support so that said fourth electrode is spaced from said first holder.

13. The method as recited in claim 12, wherein said first polarity member and said second polarity member are formed by machining from a single block of electrically conducted material.

14. The method as recited in claim 12, wherein said first and third electrodes are directly opposed along said central longitudinal axis and said second and fourth electrodes are directly opposed along said central longitudinal axis and said method further comprises fixing said rigid supports to said first and second holders so that said first and third electrodes alternate with said second and fourth electrodes at 90° intervals about said central longitudinal axis.

* * * * *